United States Patent
Baker et al.

(10) Patent No.: US 10,694,362 B2
(45) Date of Patent: Jun. 23, 2020

(54) AD-HOC SOCIAL NETWORK (AHSN) SYSTEM, AHSN-ENABLED DEVICE, AND METHODS OF USE

(71) Applicant: University of Florida Research Foundation, Inc., Gainesville, FL (US)

(72) Inventors: Corey Baker, Gainesville, FL (US); Jose Almodovar-Faria, Ponce, PR (US); Janise McNair, Newberry, FL (US)

(73) Assignee: Univeristy of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/572,369

(22) PCT Filed: May 9, 2016

(86) PCT No.: PCT/US2016/031454
§ 371 (c)(1),
(2) Date: Nov. 7, 2017

(87) PCT Pub. No.: WO2016/179583
PCT Pub. Date: Nov. 10, 2016

(65) Prior Publication Data
US 2018/0152824 A1  May 31, 2018

Related U.S. Application Data

(60) Provisional application No. 62/158,183, filed on May 7, 2015.

(51) Int. Cl.
*H04W 4/90* (2018.01)
*H04W 4/21* (2018.01)
(Continued)

(52) U.S. Cl.
CPC ............... *H04W 4/90* (2018.02); *H04L 51/20* (2013.01); *H04L 51/32* (2013.01); *H04W 4/21* (2018.02);
(Continued)

(58) Field of Classification Search
CPC ......... H04W 4/90; H04W 4/02; H04W 4/023; H04W 16/28; H04B 17/21; H04B 17/26;
(Continued)

(56) References Cited

U.S. PATENT DOCUMENTS 7,486,651 B2   2/2009   Hagiwara et al.
8,160,537 B2   4/2012   Ozer et al.
(Continued)

FOREIGN PATENT DOCUMENTS

CN   103647714   3/2014
CN   102984779   4/2014
(Continued)

OTHER PUBLICATIONS

International Search Report and Written Opinion for PCT Application PCT/US16/031454 dated Aug. 24, 2016, pp. 1-10.
(Continued)

*Primary Examiner* — Ernest G Tacsik
(74) *Attorney, Agent, or Firm* — Tomothy H. Van Dyke; Beusse, Wolter, Sanks & Maire PLLC

(57) ABSTRACT

Embodiments include a system comprising: a publisher communication device configured to publish a social message for the publisher device for delivery using a short-range wireless communication protocol to followers within an area and a forwarding message from another device for a destination device using a delay tolerant network (DTN) communication protocol without the need of the Internet, including public or private telecommunications network, or the Radio Access Network (RAN), including public or private
(Continued)

cellular or WI-FI networks. The system comprises a destination device within the area of the publisher device to receive, via the short-range wireless communication protocol, the forwarding message using a DTN communication protocol from the publisher device. The system comprises at least one social browsing communication device browsing, within the area, for the social message and which receives the social message using the short-range wireless communication protocol from the publisher device.

19 Claims, 21 Drawing Sheets

(51) Int. Cl.
    *H04W 4/80*     (2018.01)
    *H04W 88/06*     (2009.01)
    *H04W 12/02*     (2009.01)
    *H04L 12/58*     (2006.01)
    *H04W 12/00*     (2009.01)
    *H04W 84/18*     (2009.01)

(52) U.S. Cl.
    CPC ........... *H04W 4/80* (2018.02); *H04W 12/003* (2019.01); *H04W 12/02* (2013.01); *H04W 88/06* (2013.01); *H04L 2209/80* (2013.01); *H04W 84/18* (2013.01)

(58) Field of Classification Search
    CPC .. H04B 17/327; H04B 17/345; H04B 17/373; H04B 1/1036; H04B 1/709; H04B 1/71; H04B 1/7103; H04B 15/00; H04B 17/00; H04L 5/0007; H04L 5/0026; H04L 5/0032; H04L 41/069
    See application file for complete search history.

(56) References Cited

U.S. PATENT DOCUMENTS

| | | | |
|---|---|---|---|
| 8,447,231 B2 | 5/2013 | Bai et al. | |
| 8,751,407 B1 | 6/2014 | Murray | |
| 2005/0190778 A1 | 9/2005 | Ozluturk | |
| 2011/0261692 A1* | 10/2011 | Serra | H04L 45/125 370/230.1 |
| 2012/0212339 A1* | 8/2012 | Goldblatt | G08B 25/016 340/539.11 |
| 2012/0265703 A1 | 10/2012 | Basra et al. | |
| 2012/0290404 A1 | 11/2012 | Chuang et al. | |
| 2013/0091209 A1 | 4/2013 | Bennett et al. | |
| 2013/0117692 A1* | 5/2013 | Padmanabhan | H04N 21/4126 715/753 |
| 2013/0130683 A1 | 5/2013 | Krukar | |
| 2013/0217332 A1 | 8/2013 | Altman et al. | |
| 2014/0032730 A1* | 1/2014 | Fall | H04L 67/02 709/223 |
| 2014/0196025 A1 | 7/2014 | Corinella | |
| 2015/0236867 A1* | 8/2015 | Fujita | H04W 76/10 370/312 |
| 2015/0271120 A1* | 9/2015 | Langholz | H04L 51/16 709/206 |
| 2015/0281342 A1* | 10/2015 | Lee | H04L 67/1002 709/219 |
| 2015/0359013 A1* | 12/2015 | Krizik | H04W 4/08 370/341 |
| 2016/0329991 A1* | 11/2016 | Kudou | H04L 1/1671 |
| 2017/0164266 A1* | 6/2017 | Domaratsky | H04W 40/18 |

FOREIGN PATENT DOCUMENTS

| | | |
|---|---|---|
| WO | 2006033034 | 3/2006 |
| WO | 20140196637 | 1/2014 |

OTHER PUBLICATIONS

Costa, P., et al., Socially-aware routing for publish-subscribe in delay-tolerant mobile ad hoc networks, "IEEE on Journal Selected Areas in Comm.", pp. 1-6, vol. 26, Issue 5 (2013).
Urgaonkar, R., et al., Network capacity region and minimum energy function for a delay-tolerant mobile ad hoc network, "IEEE/ACM Trans. on Networking", pp. 1137-1150, vol. 19, Issue 4 (2011).
Firechat, "Open Garden", http://firechat.opengarden.com/.
Baker, C., et al. Low Energy socially cognizant routing for delay tolerant mobile networks, "IEEE", pp. 1-6 (2013).

* cited by examiner

AD-HOC SOCIAL NETWORK (AHSN) SYSTEM, AHSN-ENABLED DEVICE, AND METHODS OF USE

CROSS-REFERENCE TO RELATED APPLICATIONS

This application claims benefit of U.S. Provisional Application No. 62/158,183 filed May 7, 2015, titled "Low Energy Socially Cognizant (LESC) Routing for Mobile Ad-Hoc Social Networks" incorporated herein by reference as if set forth in full below.

BACKGROUND

Embodiments relate to ad-hoc systems and, more importantly, to an ad-hoc social network (AHSN) system, AHSN-enabled device, methods of use and non-transitory computer readable media. The ad-hoc systems have applications as an emergency medical communication system using simultaneous ad-hoc communications and a second communication system using an established infrastructure.

The use of mobile devices and wearable devices are commonplace. The wearable devices are becoming more popular as technology creates more reliable products for less cost. Therefore, many users are challenged when the Internet or other communications infrastructure is offline, such as during a disaster, power outage, or in remote locations without access to power.

Demand for wireless communications for a variety of mobile or wearable devices is expected to increase dramatically over the next decade, putting demands on resource allocation and infrastructure expansion. As users want more services, there is a limit to the fees to be charged, challenged by infrastructure expansion.

SUMMARY

Embodiments are directed to a system, device, and method to deliver communications including emergency messages, social messages and forwarded messages without the need of the Internet, including public or private telecommunications network, or the Radio Access Network (RAN), including public or private cellular or WI-FI networks. An aspect of the embodiments include a system comprising: a publisher communication device configured to publish a social message for the publisher device for delivery using a short-range wireless communication protocol to followers within an area and a forwarding message from another device for a destination device using a delay tolerant network (DTN) communication protocol without need for use of Internet or public telecommunications network. The system comprises a destination communication device within the area of the publisher communication device to receive, via the short-range wireless communication protocol, the forwarding message using a DTN communication protocol from the publisher communication device without need for use of the Internet or the public telecommunications network. The system comprises at least one social browsing communication device browsing, within the area, for the social message and which receives the social message using the short-range wireless communication protocol from the publisher communication device without the need of the Internet, including public or private telecommunications network, or the RAN, including public or private cellular or WI-FI networks.

Another aspect of the embodiments include a device comprising a mobile communication device having at least one processor configured to: selectively publish a social message for delivery using a short-range wireless communication protocol to followers within an area and a forwarding message from another device for a destination device using a first delay tolerant network (DTN) communication protocol without the need of the Internet, including public or private telecommunications network, or the RAN, including public or private cellular or WI-FI networks; selectively browse within the area for and receive a social message from another publishing communication device using the short-range wireless communication protocol without the need of the Internet, including public or private telecommunications network, or the RAN, including public or private cellular or WI-FI networks; and forward within the area, via the short-range wireless communication protocol, the forwarding message using a second DTN communication protocol to the destination device or a message forwarding device without the need of the Internet, including public or private telecommunications network, or the RAN, including public or private cellular or WI-FI networks.

Another aspect of the embodiments include a method comprising: selectively publishing, by a mobile communication device with a processor, a social message for delivery using a short-range wireless communication protocol to followers within an area and a forwarding message from another device for a destination device using a first delay tolerant network (DTN) communication protocol without the need of the Internet, including public or private telecommunications network, or the RAN, including public or private cellular or WI-FI networks; selectively browsing, by the mobile communication device, within the area for and receiving a social message from another publishing communication device using the short-range wireless communication protocol without the need of the Internet, including public or private telecommunications network, or the RAN, including public or private cellular or WI-FI networks; and forwarding within the area, via the short-range wireless communication protocol, the forwarding message using a second DTN communication protocol to the destination device or a message forwarding device without the need of the Internet, including public or private telecommunications network, or the RAN, including public or private cellular or WI-FI networks.

Embodiments are also directed to a system comprising: a publisher device configured to publish an emergency message for delivery using a short-range wireless communication protocol within an area. The system includes a dedicated subscriber device within a range of the publishing device to receive via the short-range wireless communication protocol the emergency message.

Another aspect of the embodiments include a method comprising: publishing by a publisher device an emergency message for delivery using a short-range wireless communication protocol within an area; and receiving by a dedicated subscriber device, within a range of the short-range wireless communication protocol, the emergency message.

Another aspect of the embodiments includes a device comprising: a publisher device configured to publish an emergency message for delivery using a short-range wireless communication protocol within an area. The publisher device including: a first communication interface operable to receive sensed data or emergency data; a second communication interface for communicating to a subscriber device within a range of the publishing device, using the short-range wireless communication protocol, for ad-hoc dissemination of the emergency message; and a third communication interface operable to communicate with a communication network to alert a first responder of the sensed emergency data, simultaneously with the dissemination of the emergency message using the short-range wireless communication protocol.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

Figure 14A:
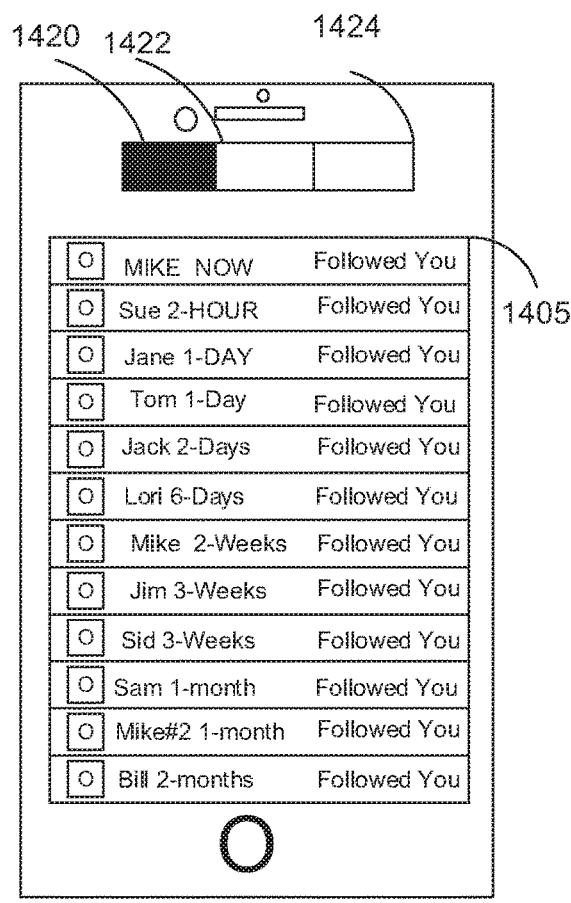
FIG. 14A illustrates a mobile device with a log of AHSN users who follow the user of mobile device.
Figure 14B:
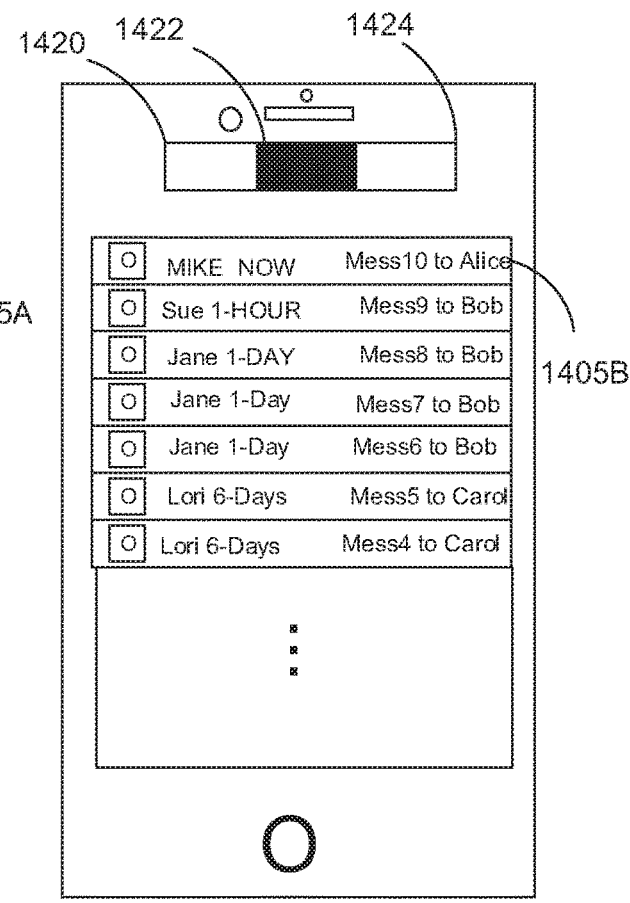
Figure 14C:
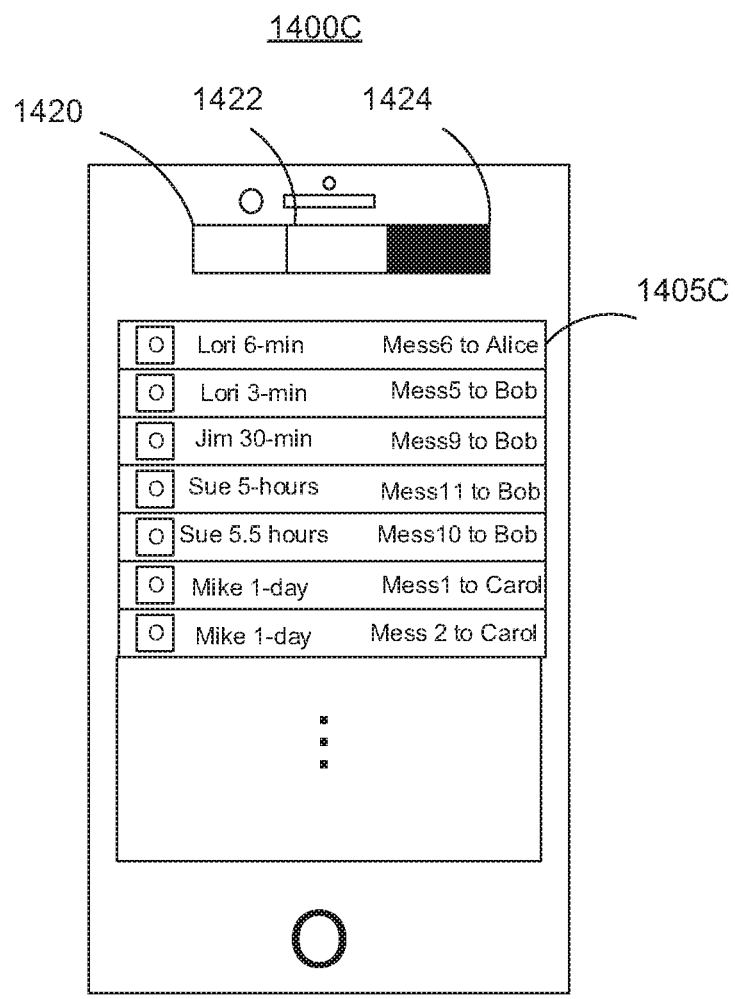
Figure 15:
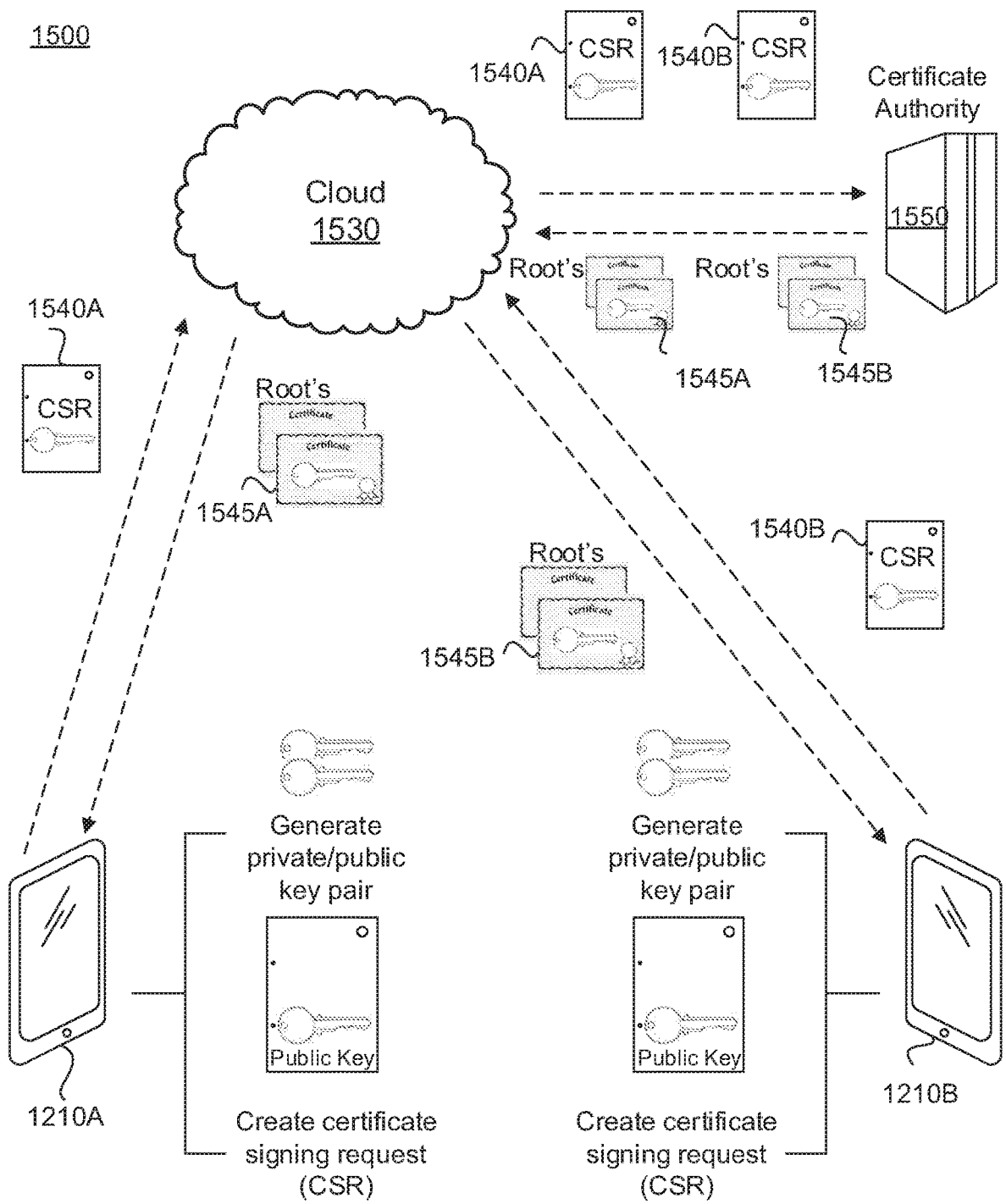
Figure 16:
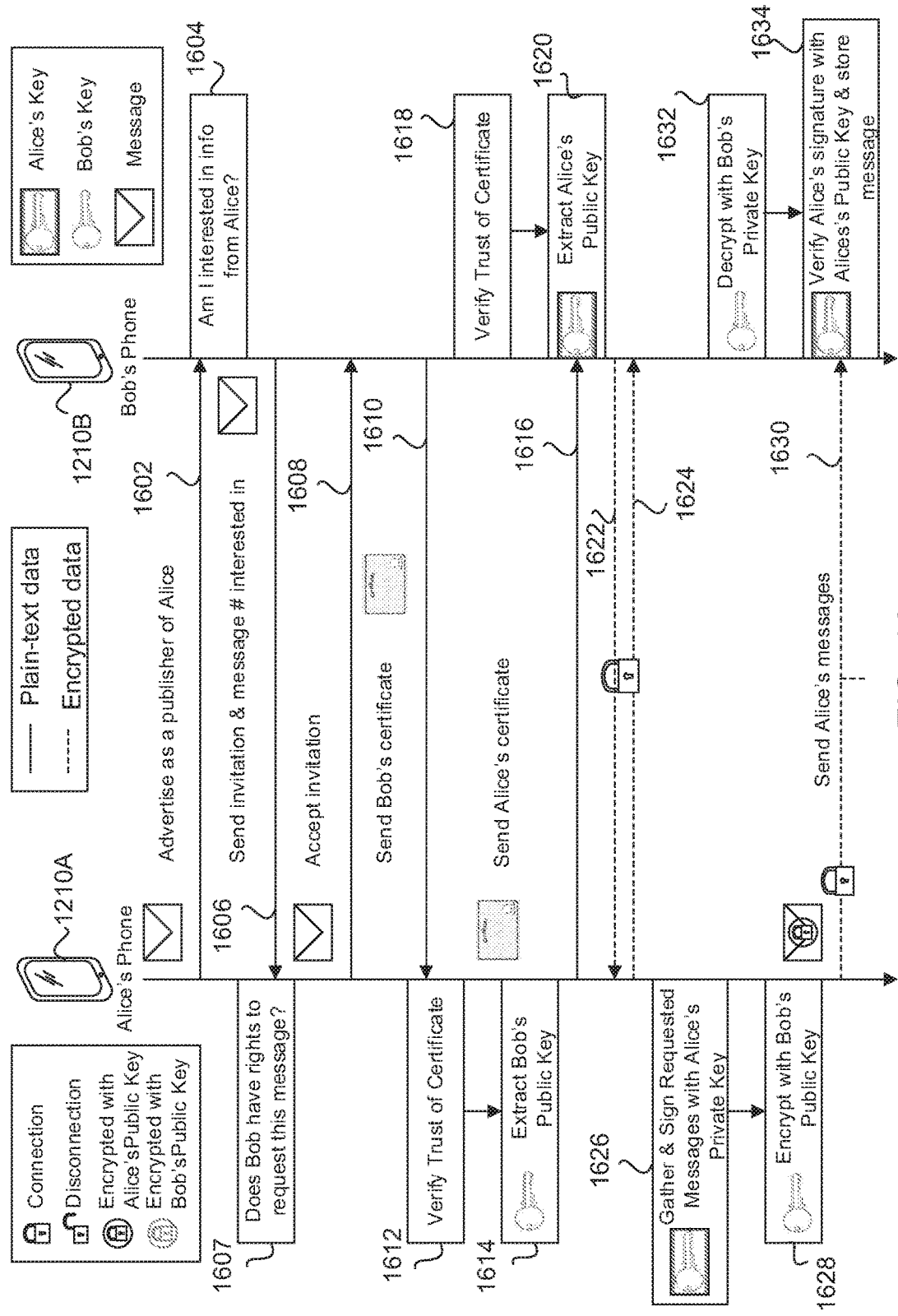
Figure 17:
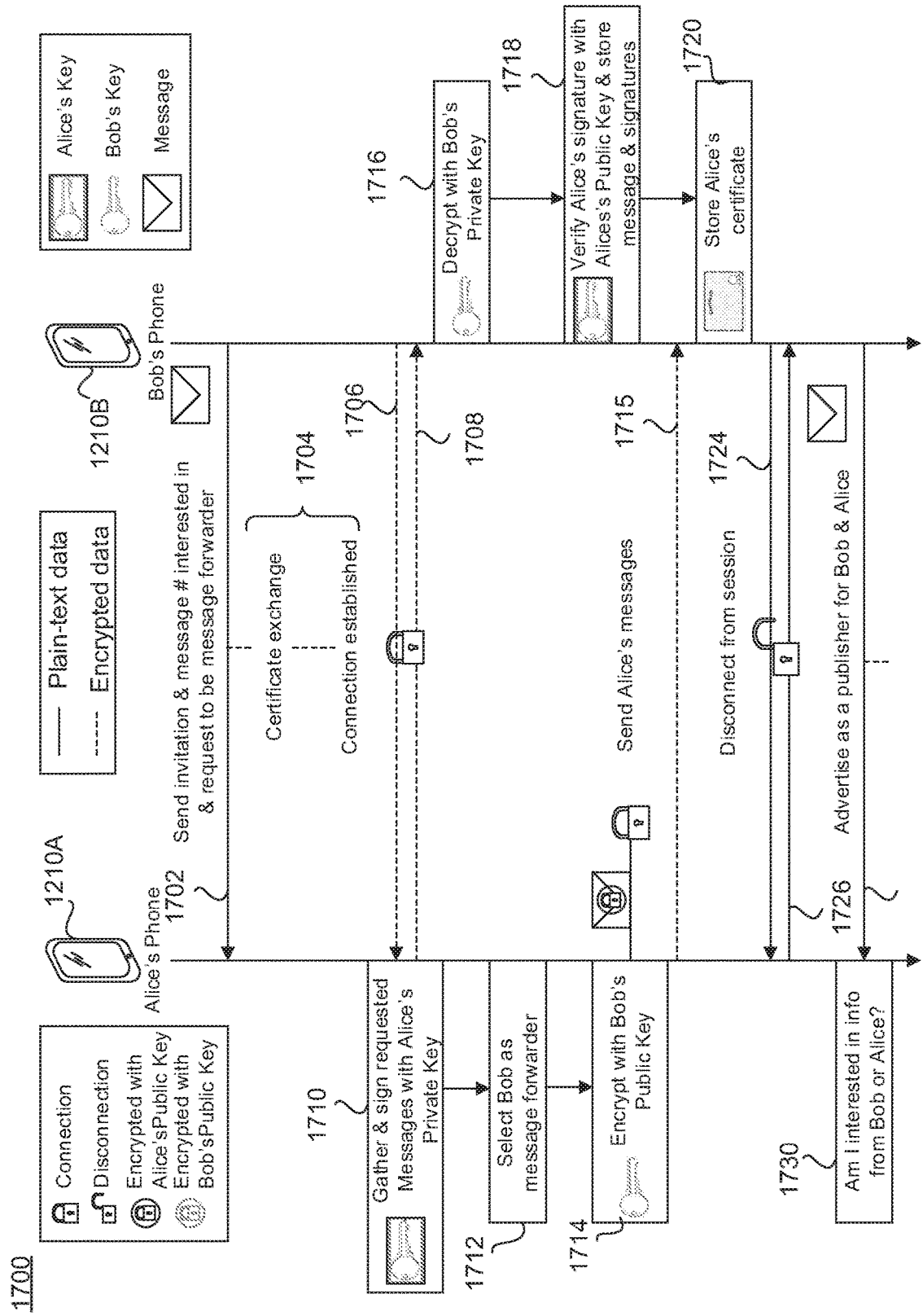
Figure 18:
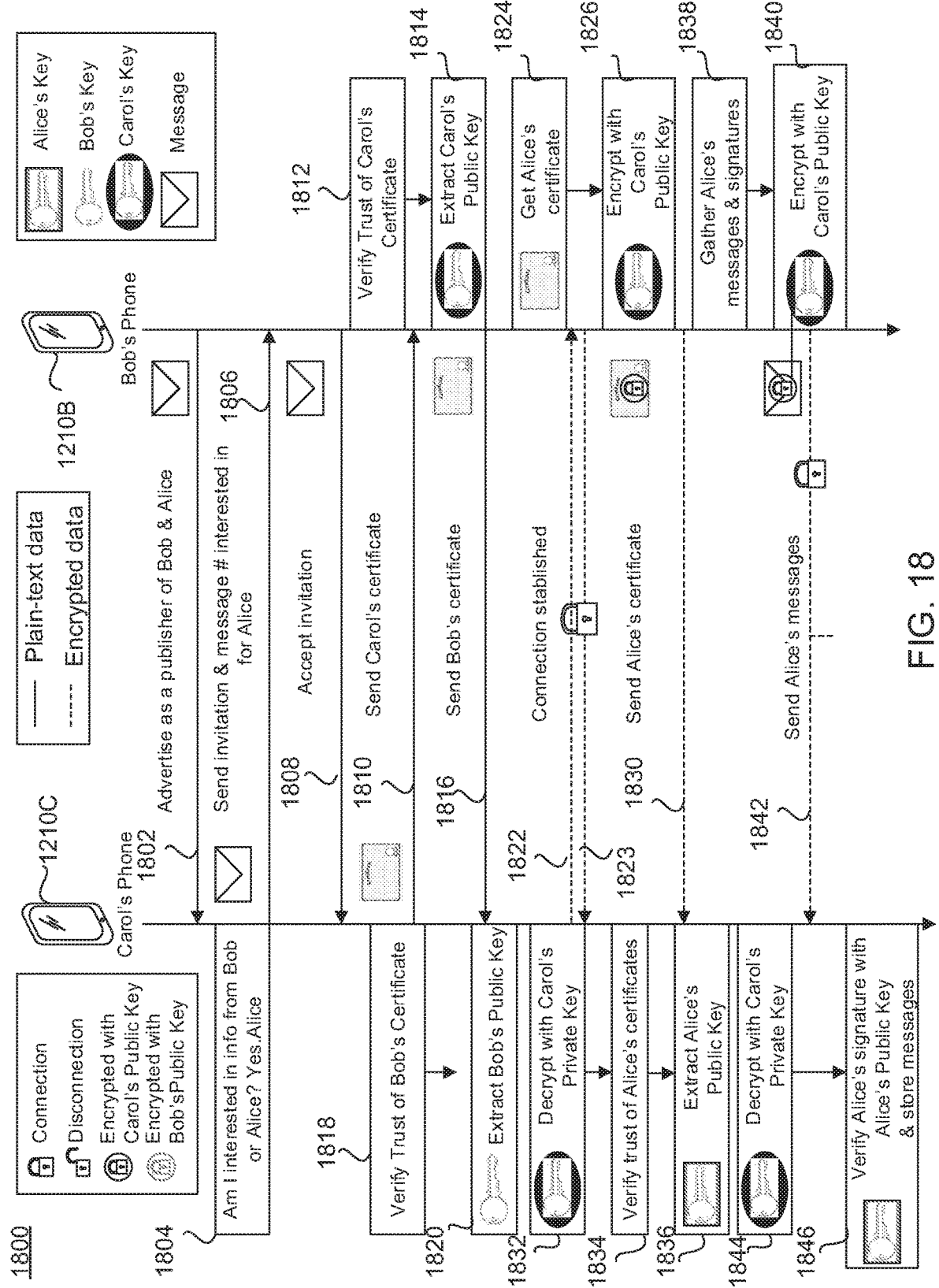

illustrates a log of AHSN users who helped passed one or more messages for a particular device;

FIG. 14B illustrates a mobile device with a log where messages of AHSN users were passed (forwarded) by the mobile device to another AHSN user;

FIG. 14C illustrates a mobile device with a log of messages to AHSN users being passed (forwarded) by another user for the device;

FIG. 15 illustrates a flow diagram of a sign up to use a secure AHSN system;

FIG. 16 illustrates a flow diagram of decentralized communications process in the secure AHSN system;

FIG. 17 illustrates a flow diagram of message forward selection communications process in the secure AHSN system; and FIG. 18 illustrates a flow diagram of message forwarder dissemination communications process in the secure AHSN system.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments may be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1A:
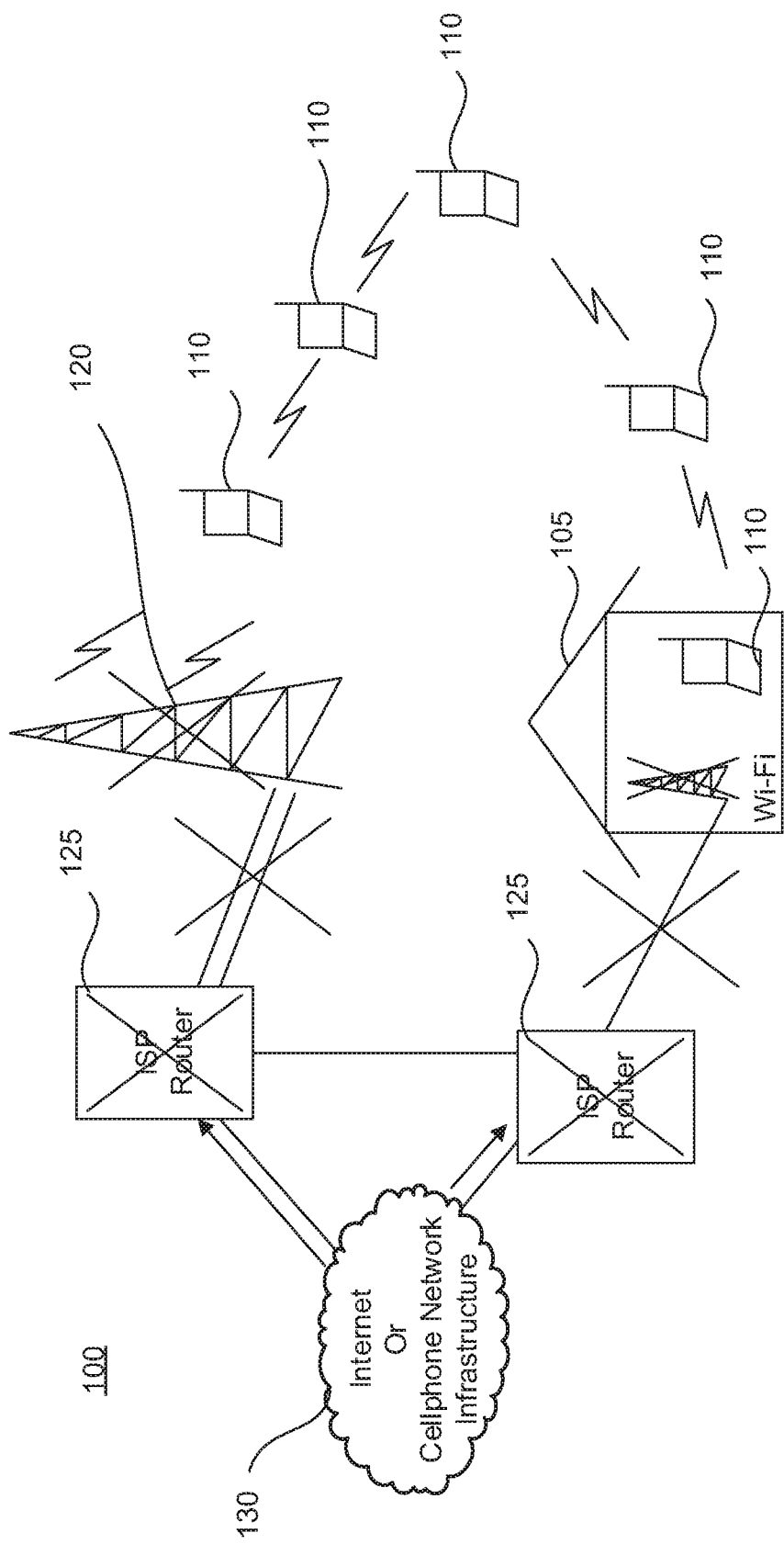
FIG. 1A illustrates block diagram for an ad-hoc communication system.

FIG. 1A illustrates block diagram for an ad-hoc communication system 100. The ad-hoc communication system 100 may be a dynamic mesh network. The system may be an ad-hoc social network (AHSN) system. The system 100 is designed to facilitate efficient local message delivery on-the-fly to inter-personally subscribed users creating a mobile ad-hoc social network. The system 100 enables people to send each other messages when they do not have access to (or do not want to access) information through the Internet infrastructure 130, a cellphone tower infrastructure or the local WI-FI infrastructure through the Internet, including public or private telecommunications network, or the RAN, including public or private cellular or WI-FI networks. An infrastructure may include at least one tower 120, internet service provider (ISP) router 125, or at least one access point that the wireless device 110 connects to, as shown in FIG. 1A but is denoted with an "X" overlaid to denote unavailability or bypassed. The local WI-FI connection to the radio access network, including public cellular network or internetwork is shown down as well by the use of an "X" overlaid to denote unavailability or bypassed. The system 100 enables people to subscribe to each other as inter-personal social groups that are formed by crossing each other's paths with no infrastructure involved, as shown in FIG. 1A. The system 100 does not enforce the "friend" approach used by FACEBOOK to establish a two-way relationship between users.

In some embodiments, as the ad-hoc communication system 100 may include one or more dynamic ad-hoc mesh networks having a short range communication area wherein wireless devices may link or complete the path to and from another ad-hoc mesh network.

In an embodiment, the system 100 is configured and designed to communicate without using existing public telecommunications infrastructure, but is able to use existing infrastructure when available. The communications are effectuated socially using a short range communication protocol (i.e., BLUETOOTH Smart, WI-FI, LTE-D, ZIGBEE, 6LoWPAN, or any other short range wireless technology available on mobile communication devices). In essence, a social network disseminating messages can exist without ever using the public telecommunications infrastructure. Instead, the messages are published and subscribed to using BLUETOOTH Smart, WI-FI, LTE-D, or any other wireless technology available on mobile devices. Messages are propagated through the system 100 by movement of other mobile devices which are Low Energy Socially Cognizant (LESC)-enabled or AHSN-enabled. The WI-FI protocol for device-to-device communication is used in an ad-hoc way as oppose to using WI-FI infrastructure mode through an access point.

In an embodiment, the system 100 uses a publish-subscribe approach, meaning a person can see the messages from a publisher if two conditions are met: (1) they are a subscriber to the publisher's social group and (2) either their device 110 crosses the path of the publisher's device 110 or their device 110 crosses the path of someone else who has crossed the path of the publisher's device (degrees of separation).

The act of "subscribing" is similar to "following" someone in TWITTER and INSTAGRAM. However, the system 100 cannot and does not use the same approaches as TWITTER and INSTAGRAM in regards to message delivery because TWITTER and INSTAGRAM require a server infrastructure to connect the user to the messages. The system 100 does not require any infrastructure for message dissemination or propagation—it uses the handheld device, mobile device, wearable devices, cellphones, notebooks, or other mobile or portable computing device. The system 100 is able to operate while being completely disconnected from the Internet 130. The system 100 does not require the use of the Internet 130 or the radio access network, including the local access points or the cellphone towers to deliver information (messages) to users. The system 100 involves device-to-device communication, such as, when people cross each other's paths, in one or more embodiments. In FIG. 1A, the wireless communication path from device 110 to device 110 represents device-to-device communications using a short range communications protocol. The device 110 closest to tower 120 (or other public telecommunications network) may not be in range of device 110 within house 105.

Figure 1B:
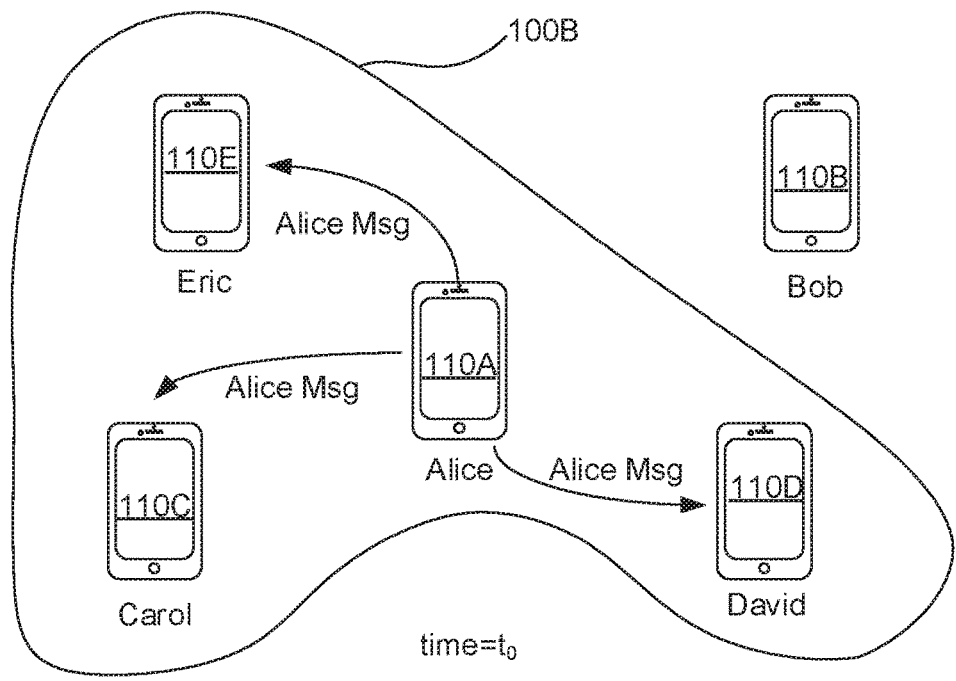
FIG. 1B-1C illustrate an ad-hoc communication system formed in close range.
Figure 1C:
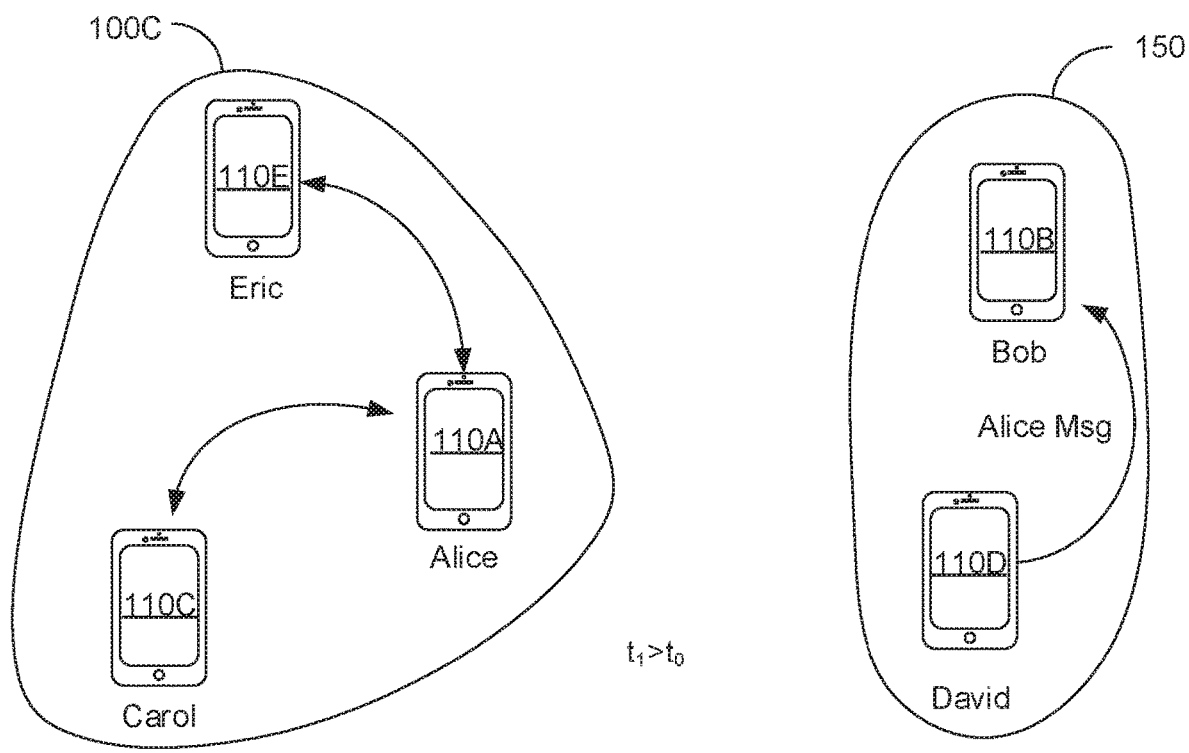

FIG. 1B-1C illustrate an ad-hoc communication system formed in close range. In FIG. 1B, Alice' mobile device 110A represents a publisher of a message (denoted as Alice msg). The message is sent to in-range subscribers following Alice, according to a short range communication protocol. The in-range subscribers are represented within the encircling line 100B. However, Bob's mobile device 110B is not in-range or within the encircling line 100B. When Bob's mobile device 110B comes in-range (denoted by encircling line 150) with David's mobile device 110D, David's device 110D is able to send or forward Bob a message received to Bob's mobile device 110B from Alice where the message originated from Alice's mobile device 110A. David was previously within the encircling line 100B and in-range with Alice's mobile device 110A. As David and Bob move and cross paths, their devices 110D and 110B, respectively, may become communicatively in-range with each other using a short range communication protocol, such as represented by encircling line 150. Carol's mobile device 110C and Eric's mobile device 110E are also shown within the encircling line 100C with Alice' mobile device 110A.

Direct-AHSN System

A Direct-AHSN system will be described in relation to FIG. 1B. In FIG. 1B, assume the encircling line 100B is configured to cover a fixed predetermined area. For example, the fixed predetermined area may include a school including related real estate, parking lot and adjacent vehicles. For example, a school may include at least one building (not shown), at least one school yard, at least one parking lots and at least one driveway within the encircling line 100B. The Direct-AHSN system would allow, each teacher (Alice) to become a publisher using a publisher LESC-enabled device (Alice's mobile device) or AHSN-enabled device. Then all other teachers, principal, assistant principle, counselors, medical personnel, staff and security to be dedicated subscribers using a LESC-enabled subscriber device 110 or AHSN-enabled device. The subscribers are represented as Carol, David and Eric.

An LESC-enabled device employs only the LESC routing protocol described in more detail below when communicating according to a mobile Ad-Hoc Social Network (AHSN) system described herein. The AHSN-enabled device employs the LESC routing protocol and other delay-tolerant network (DTN) protocols which may be selectively utilized by the user of the device.

Hence, in the event of an emergency experienced by Alice, Alice's mobile device 110A will automatically communicate an emergency message (gun in school, fight, medical condition, etc.) to the dedicated subscriber in the fixed predetermined area and especially the security officer or medical staff on campus. In one embodiment, the publisher LESC-enabled device or AHSN-enabled device may be issued to the teacher from the school. In an embodiment, all school personnel would be publishers and dedicated subscribers.

A Direct-AHSN system may be implemented by a Bank's employees. The publisher may be a bank teller and the subscriber is the assigned police officer that parks in front of or in proximity to the bank building. The Officer may be at the door of the bank as well.

Hence, in the event of an emergency experienced by Alice (the Bank teller), Alice's mobile device 110A will automatically communicate an emergency message (robbery, medical condition, etc.) to the subscribers in the fixed predetermined area (Bank) and especially the security officer. In one embodiment, the publisher LESC-enabled device or AHSN-enabled device may be issued to the teller from the Bank. In an embodiment, all bank personnel would be publishers and subscribers.

The publisher mobile device may be paired with an alert signal generator worn (such as a wearable/personal device) by the teacher (Alice) which is paired with Alice's mobile device 110A. When Alice is in-range, the alert would be received by the mobile device 110A and immediately sent to at least the dedicated subscriber device (i.e., mobile devices 110C, 110D, and 110E). Paired wearable/personal devices may include a watch, bracelet, necklace or other emergency alert generator described in more detail in FIGS. 8-11.

Returning now to FIG. 1C, in the embodiment of the Bank, for example, the message may be further propagated to another entity (i.e., Bob's mobile device 110B) when Bank subscriber David is in close range with Bob where Bob may be a Bank subscriber, other law enforcement officer or medical professional. For example, if during a robbery, David with his mobile device 110D may leave the range of the fixed predetermined area 100B, then David via David's mobile device 110D may be a mule to deliver the message to an emergency responder, law enforcement officer, medical professional, etc. outside of the range of the fixed predetermined area. Especially, in the event public communications is not readily available or easy access is denied, emergency communications can still be propagated.

The Direct-AHSN system may include a stadium in the fixed predetermined area where at least one of security, medical personnel, department of homeland security and/or others may be a publisher/subscriber using a publisher/subscriber devices to send messages immediately to all in-range LESC-enabled devices or AHSN-enabled devices within the fixed predetermined area.

The Direct-AHSN system may allow mobile devices associated with emergency responders to become a publisher using a publisher device. All nearby mobile devices may be subscriber devices in-range of an emergency responder. For example, assume Alice's mobile device 110A may be an emergency responder while mobile device 110C, 110D and 110E are nearby mobile devices in range of Alice.

The inventors have determined that the system 100 is to provide the mobile ad-hoc social network (AHSN) system that facilitates emergency message delivery when infrastructure (Internet, radio access network, including cellphone, and/or WI-FI) is not available or easily accessible. By way of non-limiting example, the system 100 may be used to deliver emergency messaging during disasters ranging from electrical or energy blackouts, hurricanes, earthquakes, tornadoes, storms, volcano eruptions and blizzards, where a "downed" Internet and radio access network (WI-FI and cellphone) and telephone system means that people are left without a means to send messages. Sometimes in order to find resources, victims of disasters walk or drive through a dangerous or destroyed area (destroyed by the disaster). With the system 100, messages are passed on-the-fly to subscribing members who cross the path of a publisher. Such message can provide locations for supplies, medical help, etc.

In an embodiment, the subscriber may be a person that has experienced a disaster relief and as a result has no resources and no access to Internet/WI-FI/phone. The publisher (sometime herein referred to as "emergency publisher") is a First Responder, e.g. Red Cross, Fire and Rescue, Police Department, FEMA, etc. The emergency publisher (i.e., First Responder) may publish an emergency message in their own LESC-enabled device or AHSN-enabled device. By way of example, the message may state "The Red Cross has set up a water station at First Street Community Center" or "There is gas available at the gas station on Eighth Ave". The messages are intended to be exemplary and not limiting in any way.

Returning now to FIGS. 1B and 1C, assume that the encircling area 100B is a portion of the disaster area. Then, as the LESC-enabled device (Alice's mobile device 110A) or an AHSN-enable device of the First Responder passes through an area conducting their ordinary duties, their device (Alice's mobile device 110A) will come within range of other LESC-enabled devices or AHSN-enabled device (i.e., mobile device 110C, 110D and 110E) in the area 100B. Any communication device within range of the First Responder's device that may be subscribed to the First Responder LESC Network/Service or AHSN service will receive the messages, provided such device is configured to operate using a short range communication protocol. In one or more embodiments, communication devices that communicate with a short range communication protocol may be able to receive and forward messages as other devices come in range.

While the description herein relates to mobile devices, some communication devices can be generally stationary but include the ability to communicate using a short range communication protocol. Such devices can equally become nodes to disseminate messages.

The user of the LESC-enabled device or AHSN-enabled device receiving the emergency message may know where the disaster-relief resources are, without having to go out and find someone to ask. The LESC or AHSN message exchanges are automated from device-to-device, so the First Responder does not even have to make physical, visual or auditory contact with anyone, or to even be aware that anyone has received the message. Yet, someone waiting in their home, or walking on the street with an LESC-enabled device (such as David, Carol and Eric mobile devices 110D, 110C and 110E) or AHSN-enabled device will receive the emergency message at their LESC-enabled device or AHSN-enabled device, when a First Responder with an LESC-enabled device or AHSN-enabled device (e.g., Alice's mobile device) passes through the immediate area such that the devices are in-range.

Returning now to FIG. 1C, as David (i.e., mobile device 110D) walks or drives out of area 100B, David may encounter at least Bob (i.e., mobile device 110B) in area 150. Area 150 may be in the disaster area but in a portion adjacent are 100C. Alternately, area 150 may be outside of the disaster area. As David or Bob travel, the information may be propagated to others.

The system 100 may also be configured to provide emergency message delivery in emergency response situations when nearby help is needed but the Internet, or radio access network, including cell phones or WI-FI, is not readily available or is down. For example, in a crowded sports arena, it may be very difficult to make a call. However, if attendees are using an LESC-enabled device or AHSN-enabled device and are subscribed to stadium security, a message may go out that will appear on each LESC-enabled device or AHSN-enabled device.

The LESC routing mechanism may include message formats, routed on top of current and emerging wireless technologies (BLUETOOTH, WI-FI, LTE-D, ZIGBEE, 6LoWPAN, etc.) available on mobile devices, tablets, and laptops running operating systems such as ANDROID, iOS, MAC OSX, WINDOWS, LINUX, etc., the subscription process, the publishing process, the forwarding process (including interpreting social behavior using the utility function). During node transmission, the mobile device's resources will be used during wireless communication such as: processor, screen, keyboard, etc. The utilization of these resources may result when propagating messages and advertisements.

BLUETOOTH LE (BLE) may be configured to provide advertising capabilities for faster discovery of devices for accessing subscribers and nodes; transmission of small amounts of data; and smaller connection times. BLE may be configured to dedicate three (3) channels to advertising (37 to 39) while utilizing the rest of the channels for connections. BLE may be configured to implement profiles.

Figure 2:
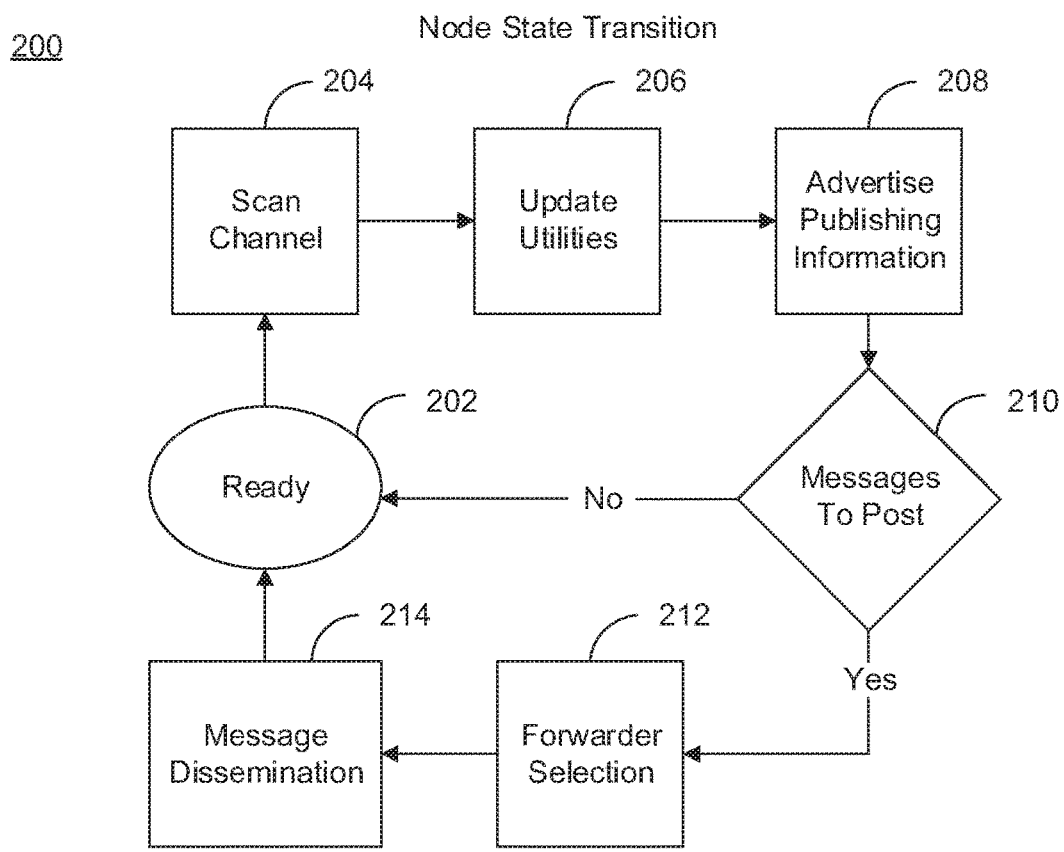
FIG. 2 illustrates a flow diagram of the node state transition.

FIG. 2 illustrates a flow diagram of the node state transition 200. The node transition state may begin at step 202 where the mobile device (i.e., device 110A, 110B, 110C, 110D or 110E) is in a ready condition. Step 202 may be followed by step 204 where the mobile device scans the channel. At step 206, the mobile device may update the utilities, as will be described in more detail below. At step 208, when the mobile device is functioning as a publisher, the mobile device will advertise, publishing information. At block 210, a determination is made whether the device has any messages to post. If the determination is "NO", the mobile device will transition back to the ready state. The loop of steps 202, 204, 206, 208 and 210 is repeated.

If the determination is "YES" at step 210, the mobile device may make a forwarder selection 212, as will be described in more detail below. At step 214, the mobile device commences the message dissemination. Block 214 may loop back to step 214, the ready state.

The process of updating utilities takes place continuously, at a periodic interval or other predetermined schedule. The utilities are used to make the forwarder selection. Thus, having a current list of utilities may allow the mobile device to make rapid decisions with near-real or real-time utilities.

The system 100 is able to find optimal routing paths (or users) to propagate messages by leveraging social characteristics and interactions of related people. When networks are dependent on user mobility, social networking analysis (SNA) may exhibit small world properties. Small world properties help characterize the social relationships between users and give insight into the high amounts of clustering of social peers. Social relationships and node clustering can then be exploited to find optimal routing paths.

To quantify the social relationships between nodes, the system 100 calculates utility values for each device or sensor. The utility value is a collection of social interaction characteristics such as frequency of collocation between nodes and number of node encounters. An up-to-date utility is a forecasted value based on a node's previous interactions and encounters with other devices and sensors. Utility values may be predicted using prediction techniques such as Kalman Filters, Extended or Unscented Kalman Filters, etc. Further details and equations for the utility value is described herein. The system 100 selects a node (i.e., mobile device) to be a "Message Forwarder" by calculating the utility value of the prospective node and if the utility value meets the minimum criteria, the prospective node becomes a "Message Forwarder", as determined at Step 212.

In Epidemic Routing, the protocol attempts to push messages to every available node. The receiving nodes replicate the process until the message eventually reaches the intended node. The inventors have determined that pushing messages to nodes who have a low probability of being in proximity of the intended node is an inefficient use of a device's resources. This typically causes unnecessary battery drainage, which is especially problematic for mobile devices and sensors that operate on small batteries ranging between 780 mAh and 1200 mAh. It also causes bottlenecks in bandwidth since BLUETOOTH may only advertise limited information.

In order to consume less energy in node discovery and message delivery, a host will publish messages to interested users only if the respective users request the information. Thus, users will only request information of interest. Using this notion, interested users only become message forwarders for hosts if the user is subscribed to the host, meaning bandwidth and power are not used on information that is meaningless to a user. All nodes may be capable of publishing messages and subscribing to multiple nodes simultaneously.

In special situations such as an emergency, all nodes may become interested users to assist with message delivery. In these special situations, user's devices may become interested in a message without the message appearing on a user's device. Designating a message to appear on user's device is application specific and can be controlled at the application layer to fit into the privacy requirements of a particular application. For example, if a person is having a heart attack the LESC enabled mobile device or AHSN-enabled device may cause surrounding mobile devices to become interested in the message and assist with message delivery. In an embodiment, the emergency message may be formatted so that only doctors or nurses who have opted-in to receive messages through an agency such as without limitation HIPAA may see the message or other agency specific to first responders (police, medical personnel, federal government agencies, etc.).

The aforementioned protocols make two general assumptions, either: (1) nodes may broadcast large subscription lists during device discovery or (2) nodes have established prior connections which allow for information exchange. In Classic BLUETOOTH radios, broadcasting of this sort is not straight forward or possible. BLUETOOTH Smart allows for node discovery and small amounts of data to be sent to neighboring nodes through advertisements. This gives LESC a distinct advantage because hosts can not only notify surrounding nodes of their presence, but may send information about messages they may be publishing without establishing a connection.

Social behavior is determined by capturing the frequency of nodes being collocated with other nodes of interest, as well as understanding a nodes ability to encounter different nodes in the network. The system 100 defines this characterization of social behavior as interest-group collocation and diversity of nomadicity. Understanding interest-group collocation and diversity of nomadicity provides insight into a node's community as well as the relationships between communities. Nodes tend to be socially related if they share similar interests with other nodes or if the devices may be collocated often. If a particular node tends to be around many users who may be interested in a message from a specific host, than that node has the ability to deliver messages from that host to surrounding interested users. A host who changes environments frequently, meaning the surrounding nodes the host changes often, defines the meaning of diversity of nomadicity. Diversity of nomadicity captures a particular node's mobility with respect to the network. Nodes who tend to be around many nodes or many different groups have an increased likelihood of delivering messages. If the interest-group collocation and diversity of nomadicity of nodes may be continuously measured, they may be exploited and predicted by using well known forecasting techniques such as Kalman, Extended Kalman, Unscented Kalman filters, etc.

The strength of the interest-group collocation and diversity of nomadicity may be aggregated into a scalar utility value to determine if an interested node is a good forwarder of a host's message. Assuming s is a subset of subscribers to the host h that the current interest i is around at time t. The interest-group collocation utility value $U_{ig\_col}$ for the interested node i calculates in respect to host h is defined in Equation (1):

$$U_{ig\_col_{h,i}}(t) = |s_{h,i}(t)| \qquad \text{Equation (1)}$$

The utility value for the diversity of nomadicity Udn of a particular interest i from a previous time t–τ to time t, assuming n is the subset of nodes i is around (in range or proximity) is defined in Equation (2):

$$U_{dn_i}(t) = |n_i(t-\tau) \cup n_i(t-\tau) \cap n_i(t)| \qquad \text{Equation (2)}$$

After the interest-group collocation and diversity of nomadicity utility values $U_{ig\_col}$, $U_{dn}$ are measured and computed using Equations (1) and (2) respectively, these values can be forecasted using the Kalman filter or other prediction filters.

The forecasted utility values may be aggregated in the following Equation (3):

$$Uh, i = w_{ig\_col} * \frac{\hat{U}\text{ig\_col}_{h,i}}{|Sh|} + w_{dn} * \frac{\hat{U}dn_i}{|z|} \quad \text{Equation (3)}$$

where $w_{ig\_col}$ and $w_{dn}$ may be the weights of importance of the interest-group collocation and diversity of nomadicity values respectively; and where |sh| is the number of subscribers a particular host has and |z| is the total number of nodes in the network. Furthermore, using forecasting techniques such as Kalman filters yields $\hat{U}_{ig\_col_{h,l}}$ and $\hat{U}dn_i$ which are the forecasted values of $U_{ig\_col}$, $U_{dn}$. Setting the weights in to $w_{ig\_col}$=1 and $w_{dn}$=0, places all of the importance on interest-group collocation. Conversely, $w_{ig\_col}$=0 and $w_{dn}$=1, places all of the importance on diversity of nomadicity.

If an interested node requests a message from a host, a connection is established between the two nodes to facilitate information exchange. The host node first determines if the interested node meets the criteria of a message forwarder by using one of two methods. The verification method determines if an interested node's utility value meets the following condition when a host has a message to publish according to Equation (4):

$$U_{i,h}(t) > U_{Th_h}(t) \quad \text{Equation (4)}$$

Where $U_{Th_h}(t)$ is defined in Equation (5)

$$U_{Th_h}(t) = (1-\varepsilon)U_h(t). \quad \text{Equation (5)}$$

The second verification method determines if the interested node's utility value meets the following condition when a host is forwarding a message for another node:

$$U_{i,h}(t) \geq (1+\varepsilon)U_h(t). \quad \text{Equation (6)}$$

In both cases ε is a hysteresis threshold which prevents the message forwarder designation from being retransmitted between nodes.

Figure 4:
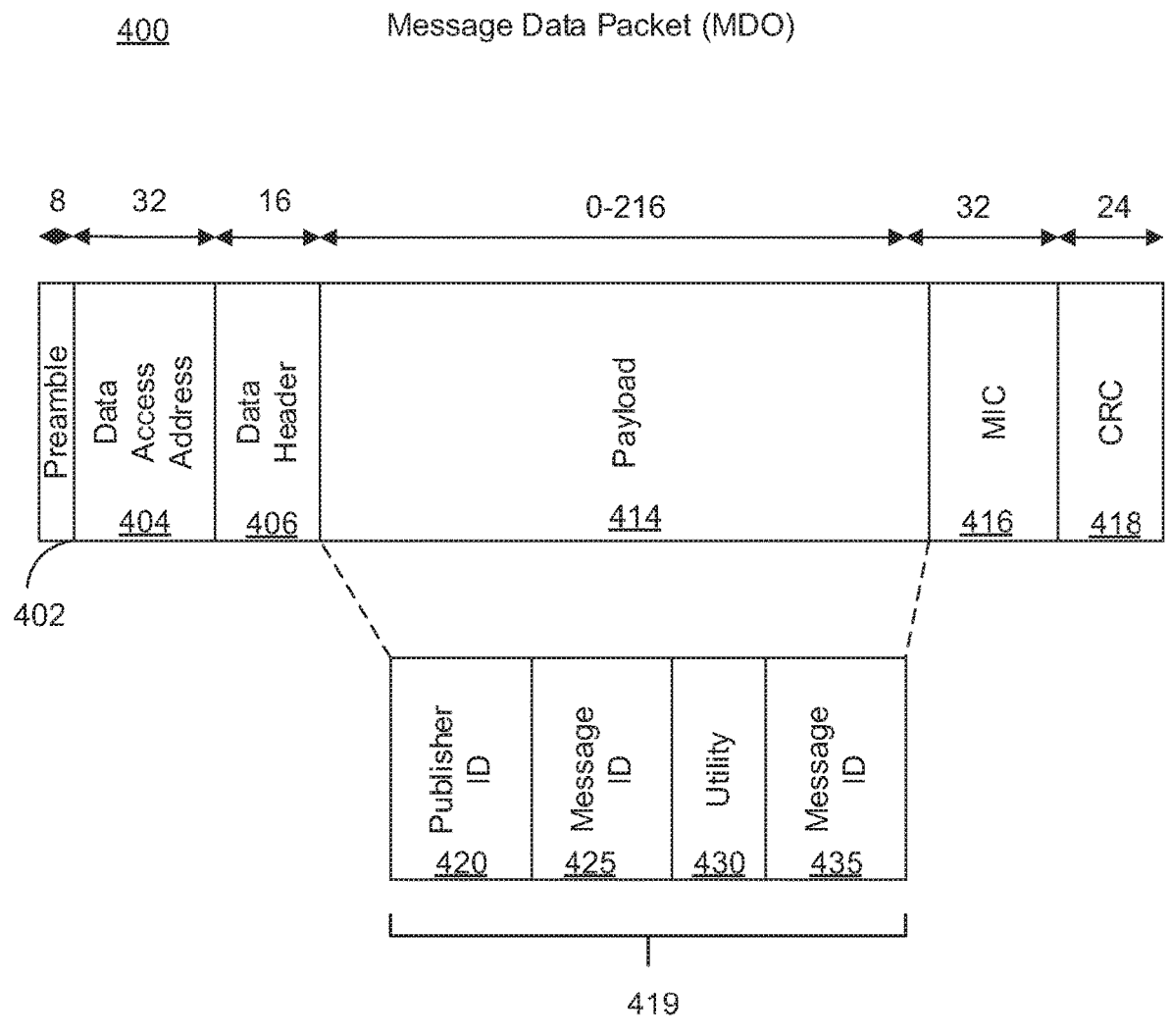
FIG. 4 illustrates a message data packet frame in BLUETOOTH Smart.

FIG. 4 illustrates a message data packet (MDP) frame 400. Messages may be disseminated to nodes only when interested node's request messages from hosts. To accomplish message dissemination, the connections established in the "Message Forwarder Selection" state (Step 212) may be maintained and the requested messages may be sent to the interested nodes. A host sends messages in the form of a Message Data Packet frame 400 which is composed of a payload 414 having a message data packet 419. The MDP 419 including a publisher ID 420, message ID 425, utility value 430, and message 435.

The message data packet frame 400 also includes a preamble field 402, a data access address field 404 and a data header field 406, before the payload 414. After the payload 414, the MIC field 416 and the CRC field 418 is added to the packet frame 400.

In an embodiment, the system will indirectly determine community and centrality of nodes dynamically by measuring the interest-group collocation and diversity of nomadicity known as utility values. Due to the recursive nature of the Kalman filters, the system 100 is able to predict collocation and utility values based on previous information about node interactions. The historical data captured through the Kalman filter predictions may be utilized to forecast a node's future interaction with other nodes.

The system 100 may propagate messages to interested nodes and designates nodes as message forwarder nodes only if the nodes under consideration may be predicted to encounter a significant amount of interested nodes in the future. Also, the system 100 may operate in an infrastructure-less environment, with no beacons or location awareness needed. In some embodiments, nodes act as individual beacons and may distribute information without knowing their location.

Routing messages through mobile nodes may be useful networks where nodes move at high velocities over long distances. In some embodiments, all nodes may be treated as mobile devices and the system 100 predicts (i.e., calculates the diversity of nomadicity) if a node will come in contact with multiple socially related end nodes for message dissemination.

In order to consume less energy n node discovery and message delivery, the system 100 may use BLUETOOTH LE. All nodes may be capable of publishing messages and subscribing to multiple nodes simultaneously. A host will publish messages to an interested user only if the user requests the information. Thus, users will only request information of interest. Using this notion, interested users only become message forwarders for hosts if the user is subscribed to the host. Meaning bandwidth and power may be not wasted on information that is meaningless to a user.

BLUETOOTH LE allows for node discovery and small amounts of data to be sent to neighboring nodes through advertisements. This gives the LESC routing protocol a distinct advantage because hosts may not only notify surrounding nodes of their presence, but may send information about messages they may be publishing without establishing a connection. In the LESC routing protocol, a node will scan and receive advertisements in the "Scan Channel" state (Step 204) in FIG. 2.

Figure 3:
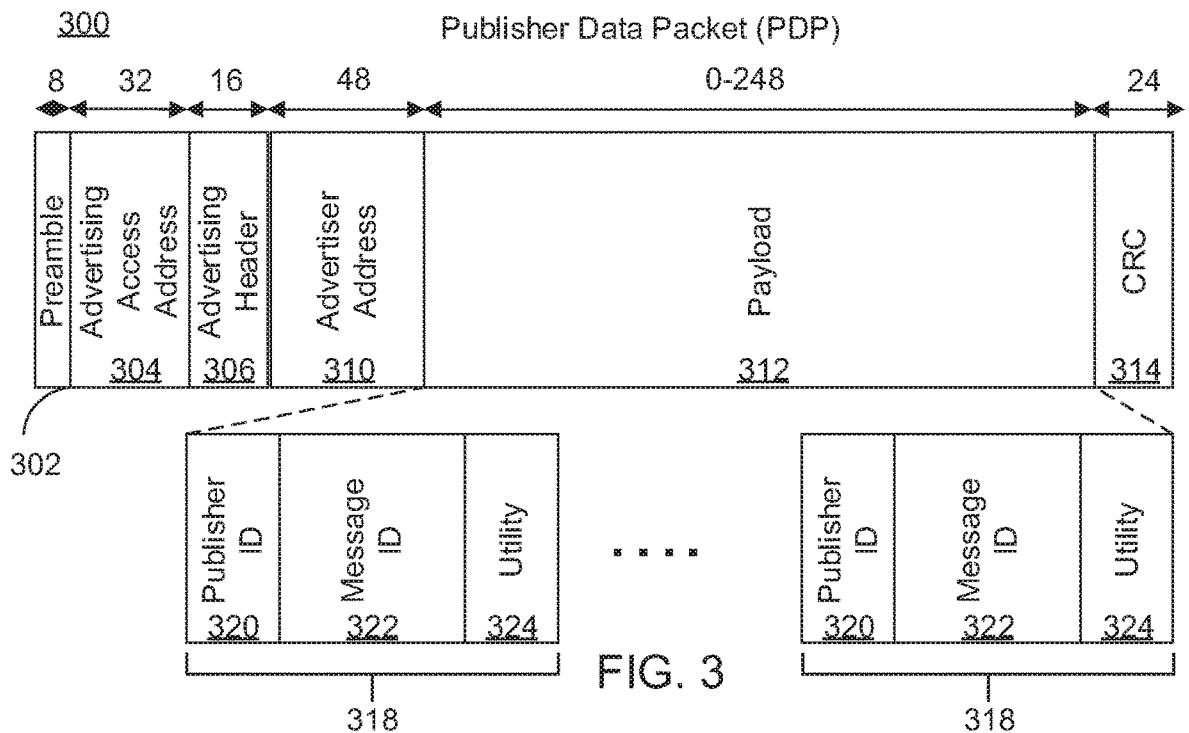
FIG. 3 illustrates a publisher data packet frame in BLUETOOTH Smart.

FIG. 3 illustrates a publisher data packet frame 300 having a publisher data packet (PDP) 318. To increase efficiency, LESC broadcasts different information in all three of the allowable BLUETOOTH LE advertising channels. The system creates a publisher data packet (PDP) 318 that includes a host, publisher identification 320, message identification 322, and utility value 324. If a host has no messages to publish or forward, the node will only advertise its host information to surrounding nodes. A node advertises the information it has to publish and forward in the "Advertise Publishing Info" state (Step 208) in FIG. 2. The publisher data packet frame 300 also includes a preamble field 302, an advertising access address field 304, an advertising header field 306, and an advertiser address field 310 before the payload 312. A payload 312 and after the payload 312, the cyclic redundancy check (CRC) field 314 is added to the advertising packet frame 300. The payload of packet frame 300 may include a plurality of publisher data packets (PDP) 318 being sets of host, publisher identification 320, message identification 322, and utility value 324.

When a host is attempting to post its own information, the host is called the publisher or advertising node. Currently, a host has the ability to place a plurality of clusters of [Publisher ID, Message ID, and Utility] in one PDP frame 300. When a host is posting messages for other devices, the host is called a "Message Forwarder". Under the constraints mentioned earlier, a particular host may send three PDPs at a time by advertising one PDP in each of the BLE channels mentioned, publishing its own information and acting as a "Message Forwarder" for a plurality of other "Publishers". The description of FIG. 3 is exemplary for a BLE channel. However, for other short range communication protocols, similar advertising/publishing channels would be employed.

Characterizing social behavior is determined by capturing the frequency of collocation between nodes along with the number of different node encounters. This characterization is termed social behavior interest-group collocation and diversity of nomadicity.

Understanding interest-group collocation and diversity of nomadicity insight on a node's community as well as the relationships between communities. Mobile devices tend to be socially related if they share similar interests with other nodes or if the devices may be collocated often. If a host's environment changes frequently, meaning the surrounding nodes change often, then the diversity of nomadicity for the host is high. Knowing the diversity of nomadicity for a host gives insight on how often the node changes communities, which may assist in message dissemination. If the interest-group collocation and the diversity of nomadicity is continuously measured, they may be exploited and forecasted using the Kalman filter. Measurements for a particular node may be gathered during the "Scan Channel" state (Step 204) in FIG. 2.

Messages may be disseminated to nodes only when interested node's request messages from hosts. To accomplish message dissemination, the connections established in the "Message Forwarder Selection" state (Step 212) may be maintained and the requested messages may be sent to the interested nodes. A host sends messages in the form of a MDP frame 400 which is composed of: publisher ID 420, message ID 425, utility value 430, and message 435. All message propagations occur in the "Message Dissemination" state (Step 214) in FIG. 2.

Figure 5:
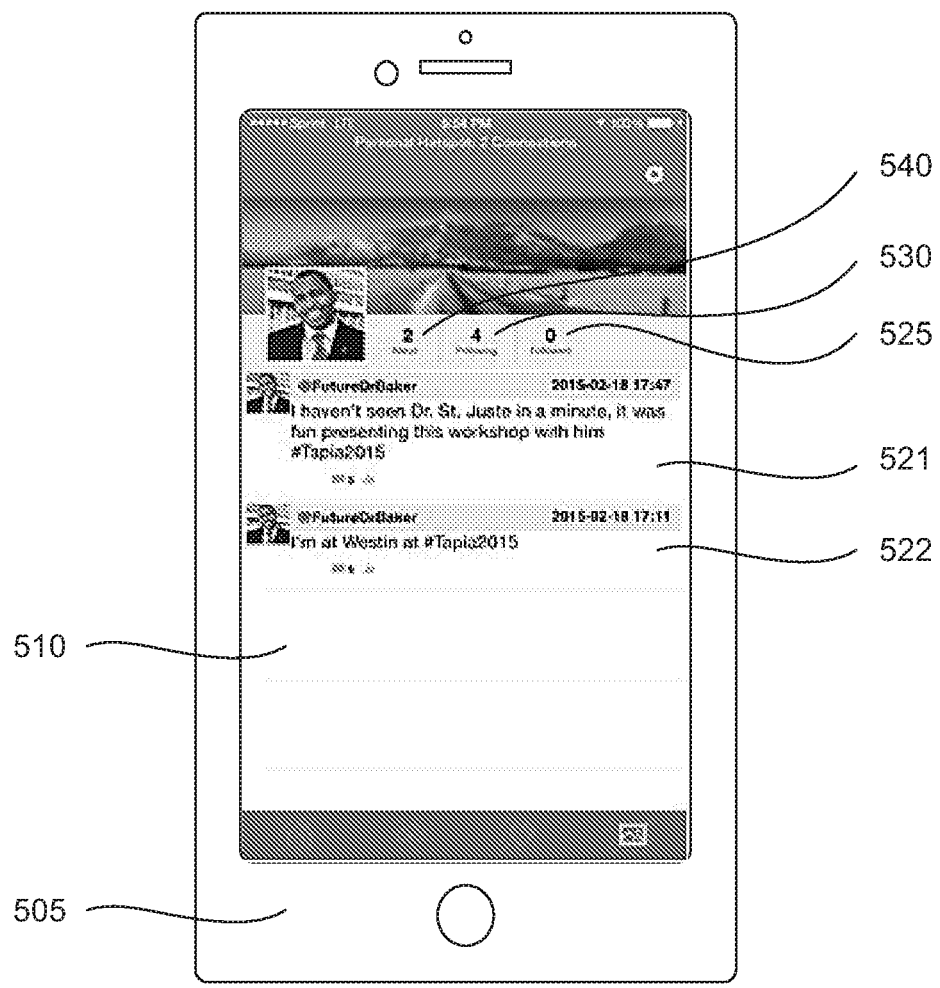
FIG. 5 illustrates an AHSN-enabled device with an AHSN tool.

FIG. 5 illustrates a LESC-enabled device 500 with an LESC tool 510. The LESC-enabled device 500 includes a computing device 505 such as a mobile phone. The mobile phone includes a display to display the LESC tool 510 to generate and publish messages 521, 522 when in a publisher state/mode, view messages from others when in a subscriber state/mode and track followers 525, track following 530 and track the amount of messages posted by a user 540. The LESC-enabled device 500 is configured to interface with a wearable device as will be described in more detail and disseminate emergency information using an ad-hoc communication protocol or AHSN protocols described later, as set forth herein.

The number of followers 525 represents the number of subscribers following a particular host. The number of following 530 represents the number the users or others the device 500 is following to receive ad-hoc messages without connecting to the internet.

During node transmission, the mobile device's resources will be used during wireless communication such as, without limitation, processor, screen, keyboard, etc. The utilization of these resources may result when propagating messages and advertisements.

Figure 7:
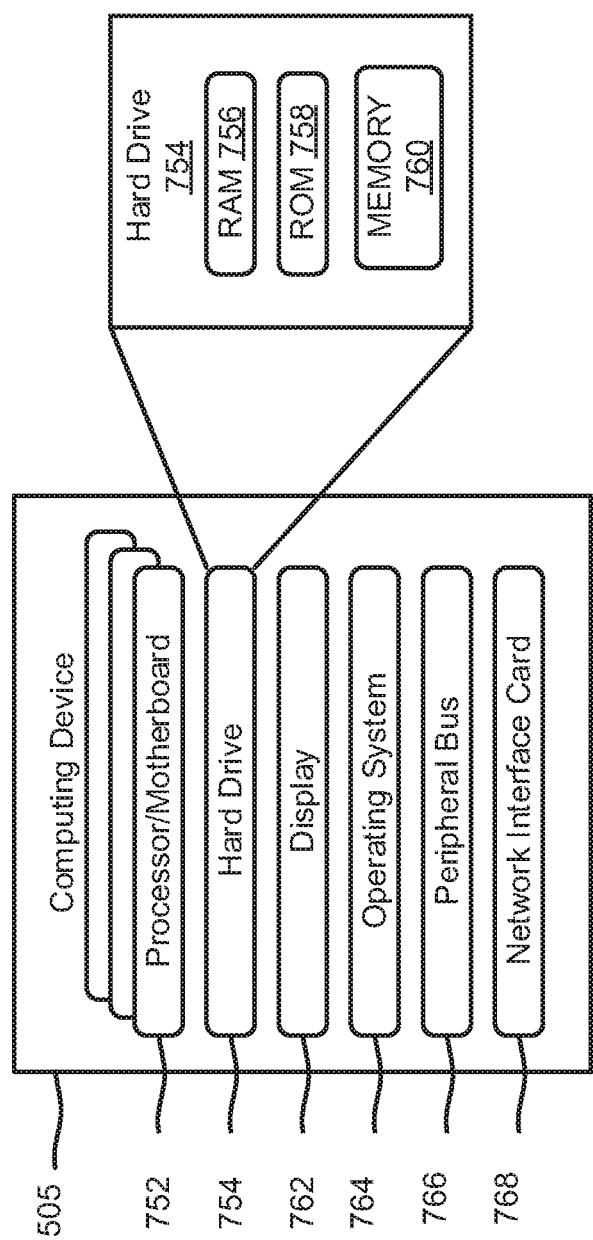
FIG. 7 illustrates a computing device.

Referring now to FIG. 7, in a basic configuration, the computing device 505 may include any type of stationary computing device or a mobile computing device, if the device is a mobile communication device. Computing device 505 may include one or more processors 752 and system memory in hard drive 754. Depending on the exact configuration and type of computing device, system memory may be volatile (such as RAM 756), non-volatile (such as read only memory (ROM 758), flash memory 760, and the like or some combination of the two. System memory may store operating system 764, one or more applications, and may include program data for performing the processes 600A and 600B, discussed in detail below. The computing device 505 may carry out one or more blocks of processes 600A and 600B.

Computing device 505 may also have additional features or functionality. For example, computing device 505 may also include or be connected to additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage may be all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which may be used to store the desired data and which may be accessed by computing device. Any such computer storage media may be part of device. The code may be stored in non-transitory, tangible computer readable medium.

Computing device 505 may also include or have interfaces for input device(s) (not shown) such as a keyboard, mouse, pen, voice input device, touch input device, etc. The computing device 505 may include or have interfaces for connection to output device(s) such as a display 762, speakers, etc. The computing device 505 may include a peripheral bus 766 for connecting to peripherals. Computing device 505 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 505 may include a network interface card 768 to connect (wired or wireless) to a network.

Computer program code for carrying out operations described above may be written in a variety of programming languages, including but not limited to a high-level programming language, such as, Swift, Objective-C, C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described may be included as a firmware in a RAM, a ROM and a flash memory. Otherwise, the code may be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

As can be appreciated, one or more of the blocks of the processes below or above may be performed in order shown or in a different order. One or more of the block may be omitted or blocks may be added. Furthermore, one or more of the block may be performed contemporaneously.

Figure 6A:
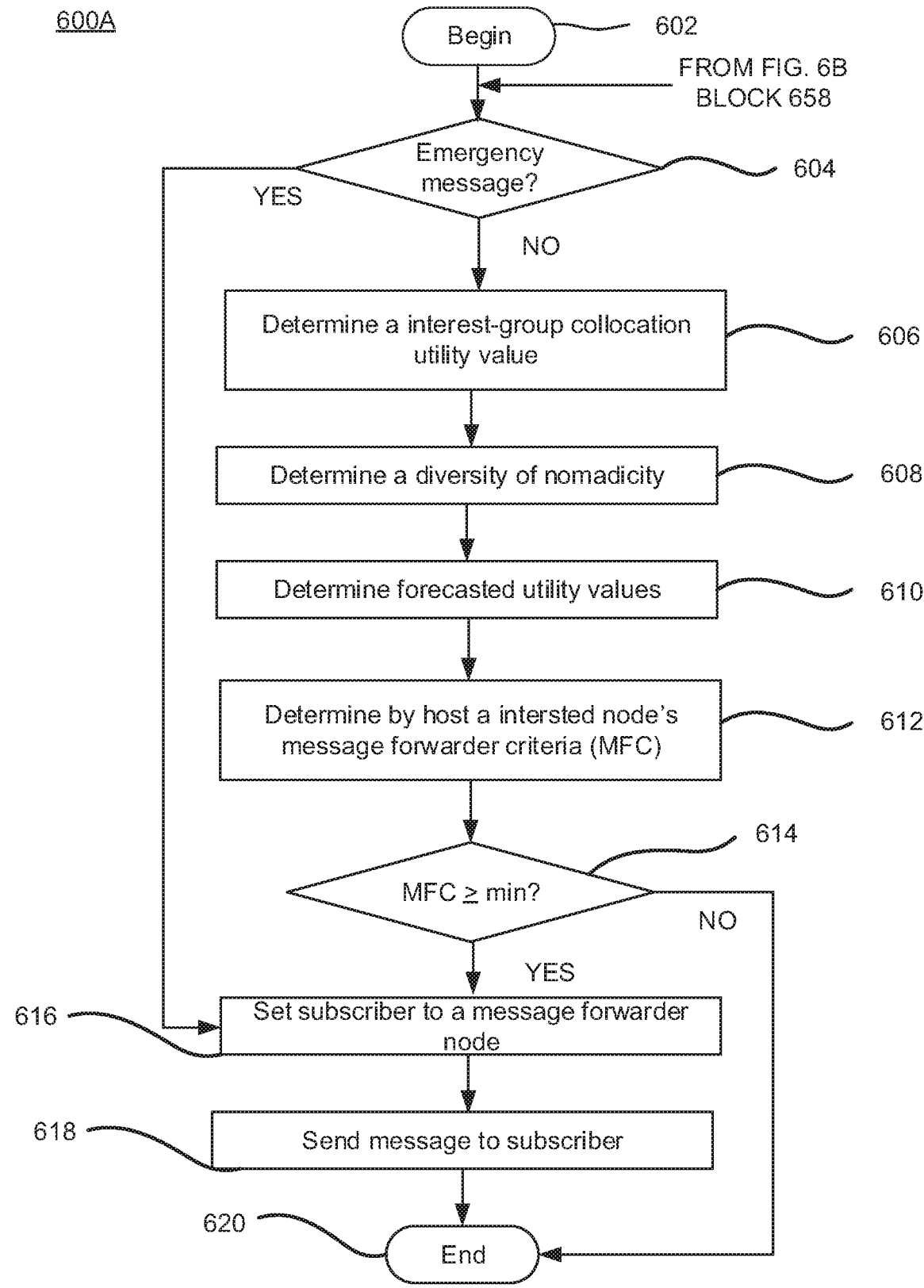
FIG. 6A illustrates a flow diagram of an emergency communications process.

FIG. 6A illustrates a flow diagram of an emergency communications process 600 for emergency messages. The process begins at block 602. At block 604 a determination is made whether an emergency message needs to be sent. If the determination is "YES," then a subscriber in-range is set to be a message forwarder at block 616. In some embodiments, one more or all subscribers in-range are set to be a message forwarder. Block 616 is followed by block 618 where the message is sent to the one more or all subscriber/nodes. At block 620, the process 600 ends. In this situation, all in-range interested subscribers may be set as nodes for message dissemination.

Returning again to block 604, if the determination is "NO" meaning that the message is not an emergency message, then the interest-group collocation utility value is determined. The formula is set forth above. At block 608, the diversity of nomadicity is determined. At block 610, the forecasted utility value is determined 610. At block 612, the host's message forwarder criteria (MFC) is determined. At block 614, a determination is made whether the MFC is greater than the MFC minimum value stored in memory. If the determination is "YES," the subscriber is set to a message forwarder at block 616. Block 616 is followed by block 618 where the message is sent to the node. Otherwise, if the determination is "NO," block 614 loops to block 620. Since LESC uses subscriber's social behaviors, subscribers only become message forwarders (nodes) for hosts if the interested node's utility value, Ui h, meets a certain threshold (MFC) deemed by the host. This ensures a node only buffers relevant information, thus minimizing the overall use of each node's publisher data packets PDPs. The process 600A may also apply to First Responder messages and/or other high priority messages, In the system 100, a low number of messages may be produced for propagation by nodes due to the trending of node interactions over time. By way of non limiting example, as nodes begin to move over paths and develop routines, nodes become more knowledgeable of their surroundings and each node better utilizes surrounding nodes to propagate messages. For example, residential neighborhoods may have a certain number of potential nodes consistently available when in the neighborhood. When in an office building, a certain number of potential nodes may consistently be available. When at a university or school, a certain number of potential nodes may consistently be available. The mobile device may track nodes by location to better utilize surrounding nodes to propagate messages.

Figure 1D:
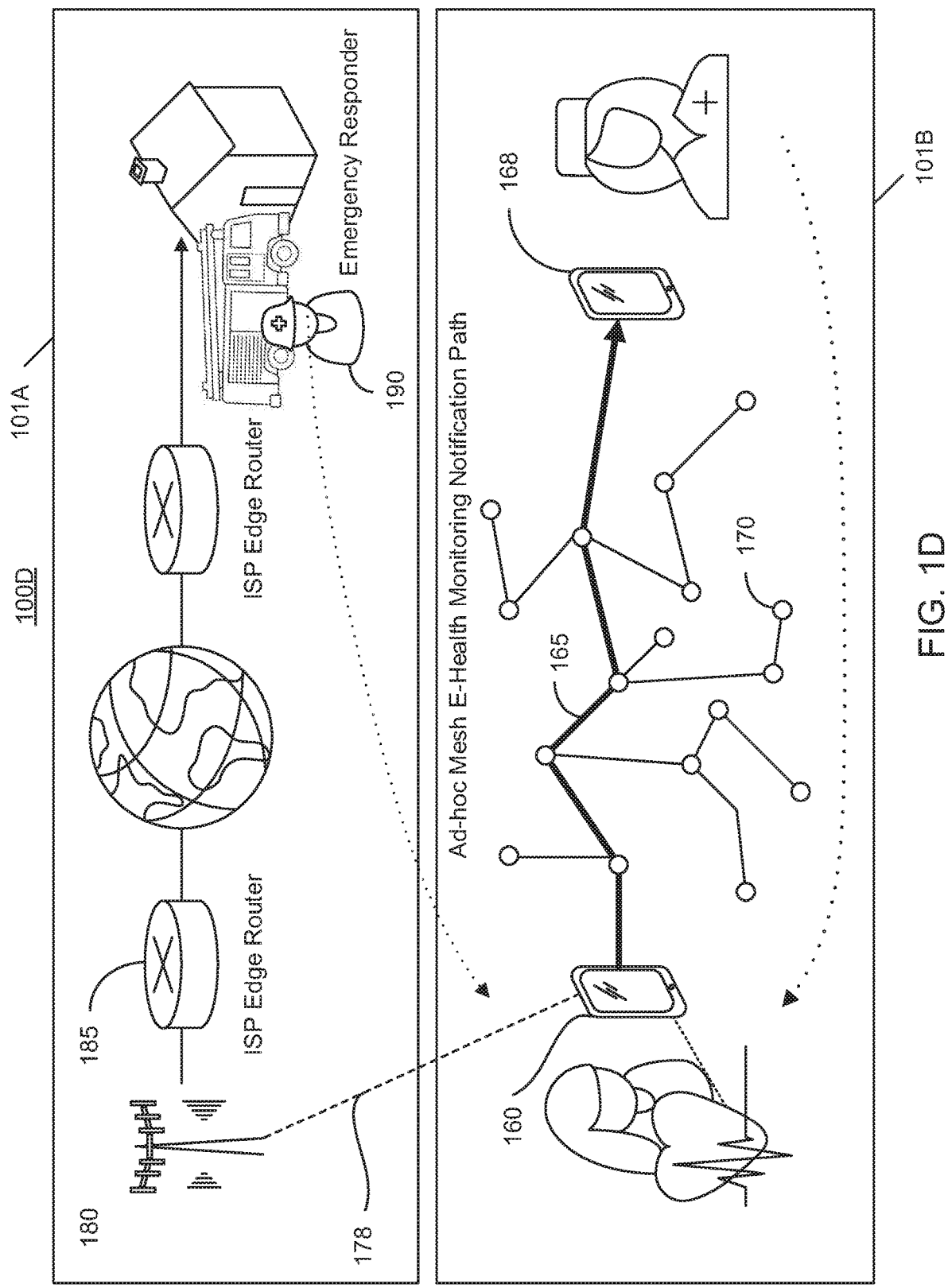
FIG. 1D illustrates a block diagram for an emergency dual communication system.
Figure 6B:
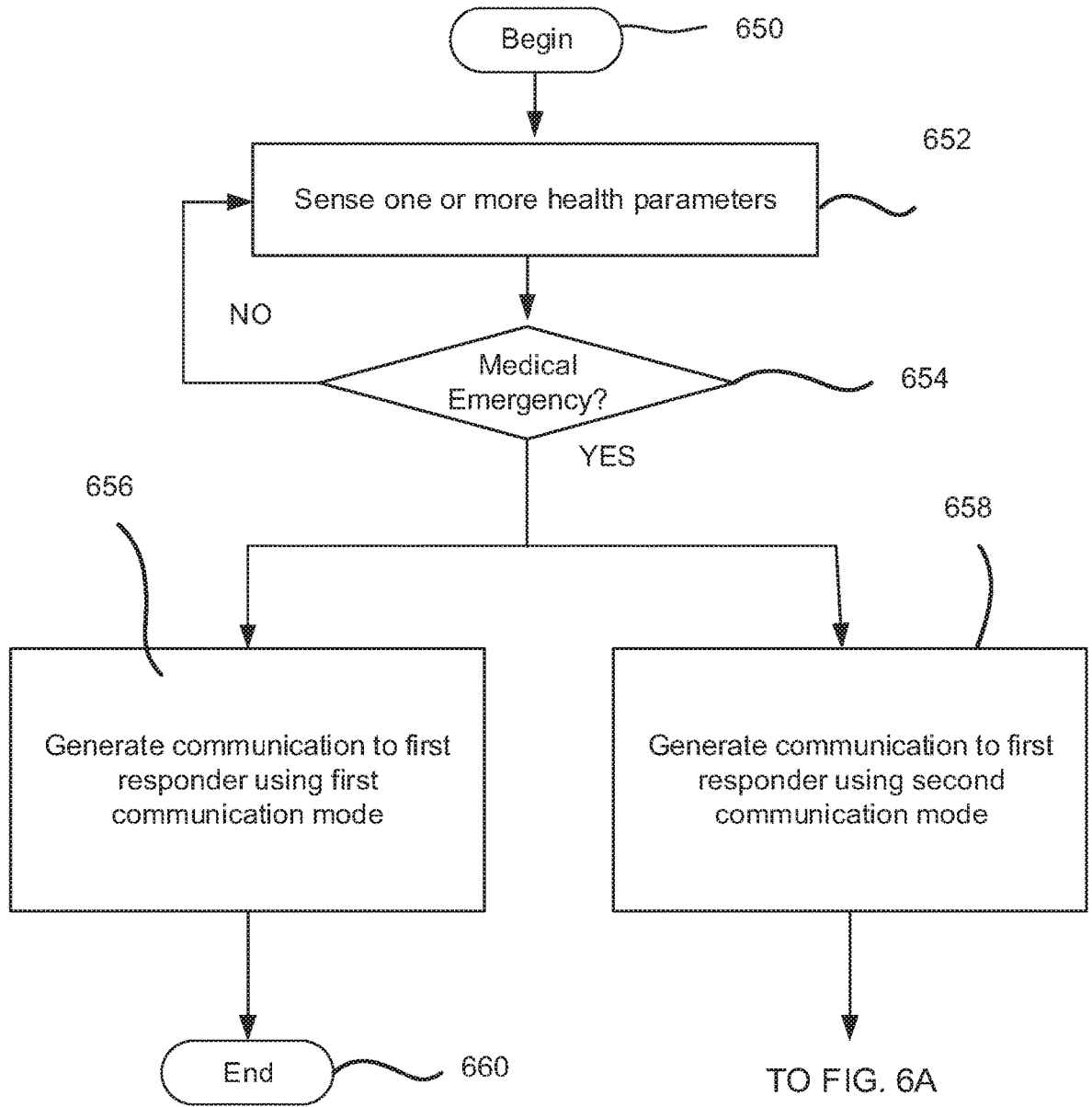
FIG. 6B illustrates a flow diagram of dual emergency communications process.

FIG. 6B illustrates a flow diagram of dual emergency communications process 600B. FIG. 6B will be described in relation to FIG. 1D. FIG. 1D illustrates a block diagram for an emergency dual communication system 100D. The process 600B begins at block 650. At block 652, the process receives sensed data at LESC-enabled device or AHSN-enabled device 160 such as one or more health parameters from at least one wearable/personal device (i.e., 910 of FIG. 9) or other medical sensing device associated with a LESC-enabled device or AHSN-enabled device. The at least one wearable/personal device may include a body area network (BAN) for sensing a plurality of health parameters. The sensing of the plurality of health parameters may take place simultaneously. The process 600B may also apply to First Responder messages and/or other high priority messages. Instead of detecting a medical alert, other sensed parameters may be detected for generating an emergency message.

At block 654, a determination is made whether a medical emergency exists based on the sensed data. If the determination is "NO," the process 600B loops back to block 652. However, if the determination is "YES," then both blocks 656 and 658 commence. At block 656, a communication is generated to a first responder using a first communication mode over communication link 178 (FIG. 1D) which may be wireless to tower 180 in block 101A of FIG. 1D, Intranet or Internet. The tower 180 may be part of a cellular system or other internet infrastructure. Communications from tower 180 may be routed to an internet service provider (ISP) edge router 185 over the World Wide Web (WWW) to another ISP edge router 185 to a communication system associated with a first responder. For illustrative purposes, the communication may be sent to the fire department, police department, etc. using conventional wired or wireless communication infrastructure. The tower 180, ISP edge router, WWW, ISP edge router 185 to the emergency responder communication system is the infrastructure for a first mode and may include public utilities such as a public telephone network.

At block 658, a communication is generated to a first responder or other designated mobile device using a second communication mode wherein the generated message is sent using the procedure of 600A. The process 600B ends at block 660 for the first communication mode and at block 620 for the second communication mode. The second communication mode may generate a plurality of nodes 170 denoted by the dots 170 in block 101B. The path 165, denoted by the thickened line, is created by the interactions between nodes passing the emergency message from node to node until it reaches a mobile device 168 of a health care professional. The route from device 160 to device 168 may use an ad-hoc social network (AHSN). The route from device 160 using path 178 uses a public communication network such as the Internet and/or other mobile/cellular communications infrastructure.

Node-to-node, subscriber-to-publisher, publisher-to-subscriber may communicate using BLUETOOTH LE. BLUETOOTH LE may employ 128 bit advance encryption standard (A CCM cryptography ensuring the security of message dissemination. The routing protocol requires nodes to frequently advertise information about themselves as well as information on current subscriptions.

Figure 8:
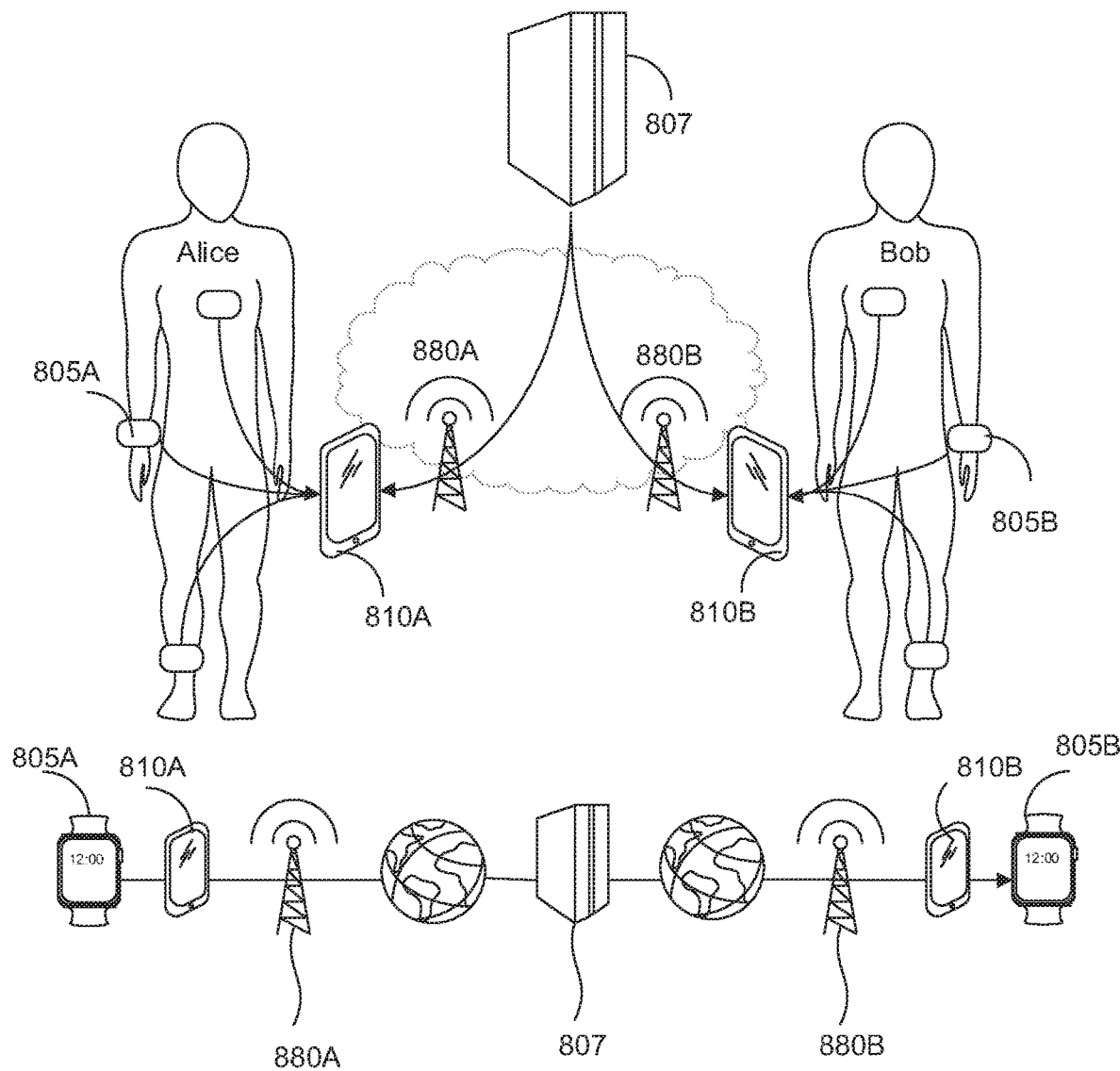
FIG. 8 illustrates a personal communication system with wearables.

FIG. 8 illustrates a personal communication system 800. The system 800 may include one or more wearable/personal devices 805A coupled to a computing device such as a mobile computing device 810A associated with a user such as Alice. The mobile computing device 810A may communicate via a tower 880A to a server 807 via network communications path. The server 807 may communicate with mobile device 810B via network communication path having tower 880B. The server 807 may be a cloud server. The mobile device 810B for user Bob may also have one or more wearable/personal devices 805B coupled to it such as via a wireless or wireless communication protocol. The sensed data from the one or more wearable/personal devices 805A or 805B may be stored in server 807.

Mobile wearable communications facilitate a vast range of possibilities when it comes to monitoring, awareness, and updating peers with vital information. Previously, communications for wearables focused on biosensors for patients who received medical monitoring. Today, advancements in wireless communications allow for patient monitoring to occur from almost anywhere and allow users to monitor themselves and their surroundings to improve their health and awareness. They also assist in emergency, response situations when users lose the ability to communicate properly due to illness. However, there is still a delay in response time where the response time may vary based on a plurality of real-time factors. Real-time factors may include the distance from a patient's current location to an available first responder location (ambulance, police officer, etc.) and time to availability. The system 900 (FIG. 9) may generate two communications to be sent using two different communication modes which may increase the probability of a nearby first responder to aid an emergency in close proximity. By way of non-limiting example, a neighbor being a doctor, nurse, or paramedic may receive the medical alert sent via system 100. Alternately, by way of example, a first responder in the area (in-range) may receive the message quicker than the traditional messaging route.

Figure 9:
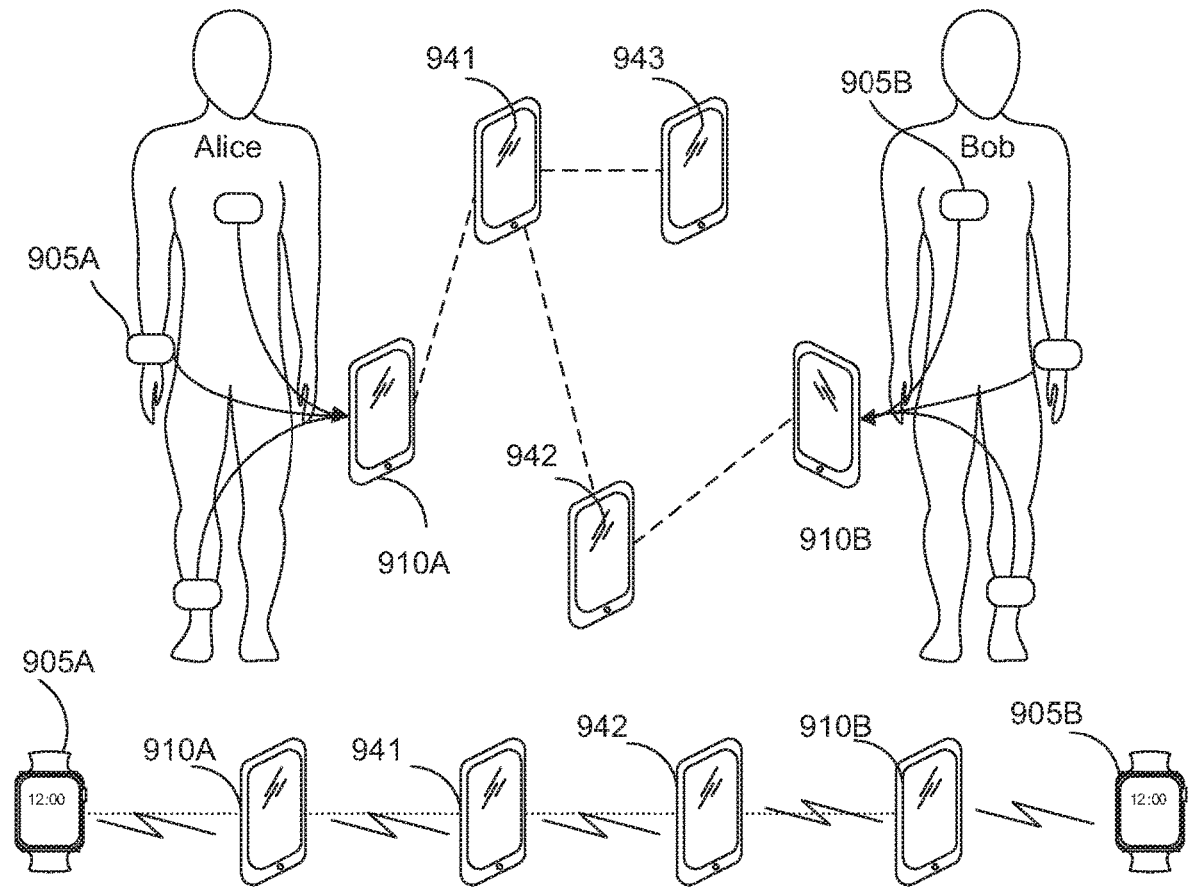
FIG. 9 illustrates an ad-hoc communication system with wearables.

FIG. 9 illustrates an ad-hoc communication system 900 with wearable/personal devices. The system 900 includes one or more wearable/personal devices 905A coupled to a computing device such as a mobile computing device 910A of Alice. The mobile computing device 910A (Alice) communicates via a mesh network or ad-hoc communication network using one or more of nodes 941, 942 and 943 which disseminate a message or sensed data from mobile device 910A to mobile device 910B (Bob).

Additionally, the mesh network or ad-hoc communication network including nodes 941, 942 and 943 may communicate a message or sensed data from mobile device 910B (Bob) to mobile device 910A (Alice), wherein one or more wearable/personal devices 905B are associated with Bob and communicate with mobile device 910B. In the illustration, at least one message from mobile device 910A associated with Alice arrives using nodes 941 and 942 at mobile device 910B associated with Bob.

Recently, new applications for wearable/personal devices (i.e., devices 905A and 905B) have come to the forefront of research, ranging from fitness bands to Google® glass that would benefit from ad-hoc approaches. However, the new applications of wearable/personal devices also require new considerations for software, hardware, and security. From a security standpoint, mobile devices may be capturing sensitive information about users and creating possibilities for data leakage vulnerabilities and misuse of data. From a user standpoint, users want applications that may be intuitive, consume minimal power, responsive, and that provide trust and privacy. Maintaining the right balance between all of the aforementioned features may be cumbersome, but is essential for designing engaging and user friendly applications. Wearable/personal devices need to be able to communicate at any time, even when centralized infrastructures, such as the Internet, may be unavailable.

The ad-hoc or mesh social network may allow two individuals to perform a competitive sport at different locations with the monitoring of the sport being communicated between the "competitors" using the AHSN system.

Body area networks (BANS), more specifically for electronic health monitoring may communicate over the system 100 using a mobile device which is LESC-enabled or AHSN-enabled. A body area network (BAN) may comprise multiple biosensors (wearable/personal devices 905A or 905B) located on or within the body which communicate wirelessly with other sensors and nearby computing devices (i.e., mobile devices 915 or 925) in a trusted fashion. These sensors 905A or 905B may monitor heart rate, physical activity, and other physiological measurements and push the data to trusted aggregation points (e.g. smartphone, PC, or cloud service). Since sensors in BANs typically connect to aggregation points, simple star topologies tend to be sufficient for most deployments.

Figure 10:
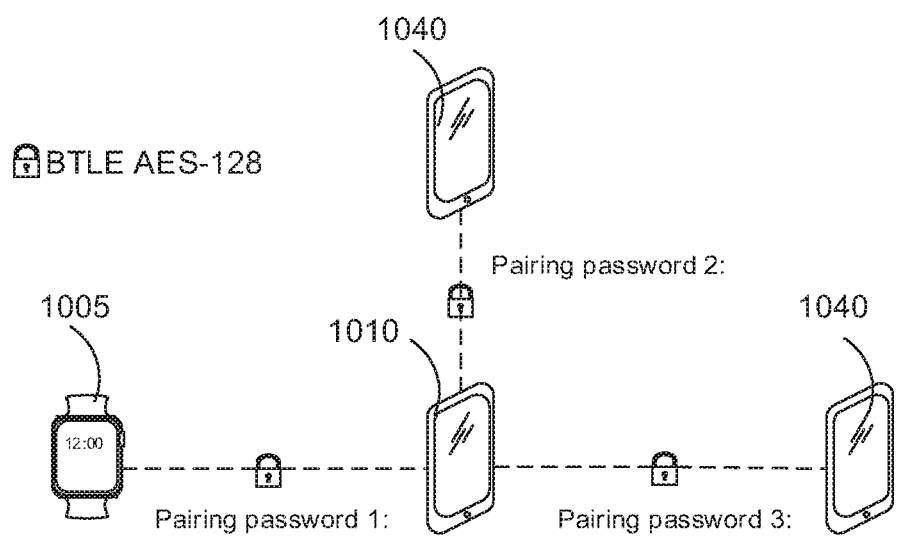
FIG. 10 illustrates a personal communication system with device pairing.
Figure 11:
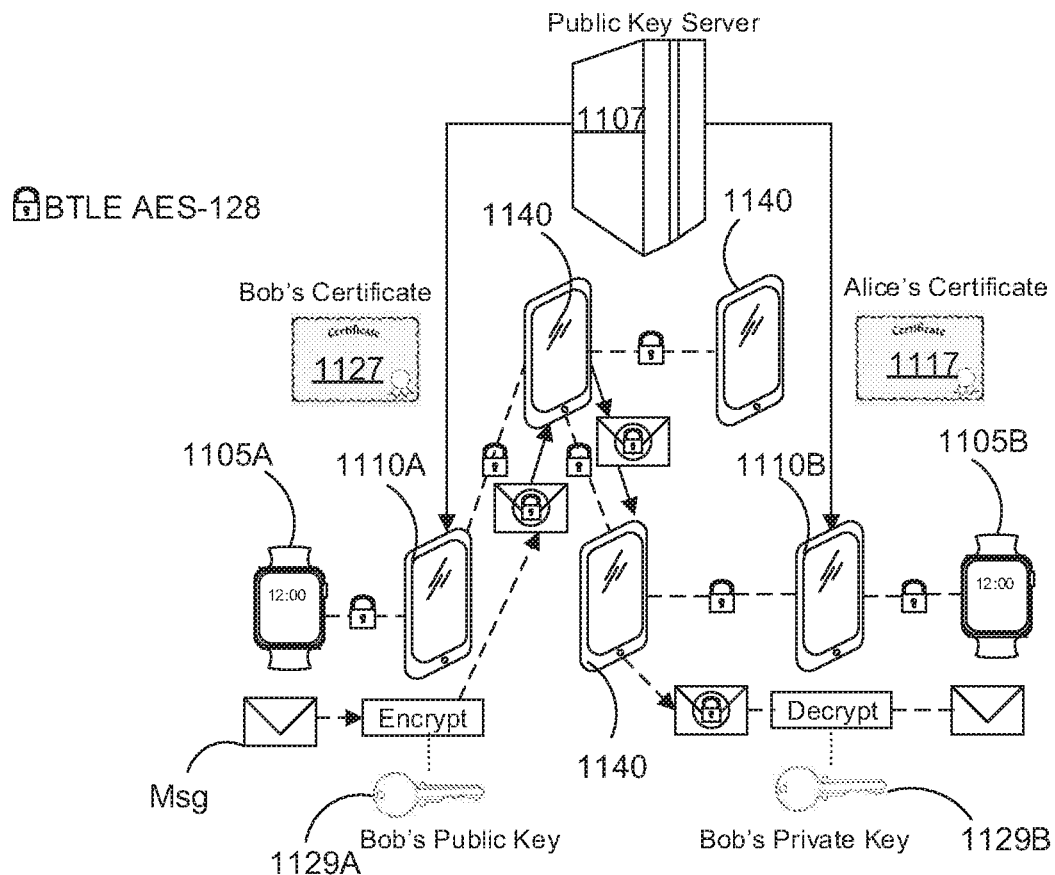
FIG. 11 illustrates a secure ad-hoc communication system.

Referring now to FIGS. 10 and 11, the advent of fitness bands and smart devices (i.e. glasses, watches 1005, insoles, shirts) has created a new class of wearable/personal devices dedicated to enhancing physical fitness and enriching social interactions. Unlike the previous generation of biosensors which focused on electronic health monitoring, the new wave of commercial wearable/personal devices have less stringent networking requirements since they may be monitoring more delay insensitive information. For example, fitness bands (or smart insoles) record a person's physical activity throughout the day and synchronize via BLUETOOTH with a smartphone 1015 application or PC. The smartphone application (a.k.a. the aggregator) adds meaning and context to the collected information and allows for cloud data backup and social sharing. In such scenarios, the wearable device only communicates with another device for a few seconds per day and is not dependent on continual wireless connections. This is a strong departure from previous e-health wearables which provide a constant stream of real-time data about the user's health.

Advances in semiconductor lithography have also allowed for more powerful and energy efficient wearable devices capable of running complete operating systems and third-party applications. For example, both smart glasses and smartwatches come equipped with advanced RISC machine (ARM) processors containing hundreds of megabytes of RAM, gigabytes of flash storage, and multiple wireless communication technologies. Google® Glass supports both WI-FI and BLUETOOTH allowing the device to connect directly to the cloud without any critical dependency on a smartphone or personal computer (PC). Samsung®, Galaxy Gear (smartwatch) comes equipped with BLUETOOTH and near field communications (NFC) capabilities and it accesses the cloud via a smartphone through BLUETOOTH tethering on the devices ranging from web browsers to fitness and social applications that may communicate directly through the cloud. Therefore, these high-powered wearables may also serve as the aggregators for biosensors in BANS enabling for a more versatile computing experience.

As discussed earlier, commercially available wearable/personal device technologies commonly utilize a straightforward path to the cloud either through a direct WI-FI connection or BLUETOOTH tethering. Therefore, a fitness app running on a smartwatch 1105A or 1105E may push data to the cloud only if tethered to a smartphone 1110A or 1110B. Other wearables such as fitness bands and smart insoles primarily record physical activity and do not allow third-party software to run on the device. These lightweight wearable/personal devices may require an additional application to be installed on a smartphone or PC for synchronization and additional features. For instance, a fitness band might sync (synchronize) up with its accompanying fitness software on a smartphone. Afterwards, the software on the smartphone updates the data on the cloud and allows users to share it with friends through the smartphone. This model is more reminiscent of the traditional BAN-based biosensors that only perform activity tracking and synchronization with an aggregator. The aggregator then provides the additional functionalities such as data analysis and backup.

An advantage of this client-server model of communication is its simplicity as it does not require any complex networking middleware. By reusing standard internet protocol (IP) communications, social peers may be able to share information through centralized services in the cloud. However, this approach suffers from a single-point of failure in that it requires an IP backbone for two mobile nodes to communicate. For example, if a health professional needs to access a patient's physical activity records, he/she has to connect to the cloud server 1107 through the Internet to obtain the data. In some cases, the Internet backbone may not be available due to an Outage, leaving the health professional unable to retrieve the records.

Ad-hoc mobile wireless technologies via nodes 1140 provide a path for wearables to communicate without having to go through an IP-based cloud service. Wireless communication technologies such as WI-FI-Direct, BLUETOOTH LE and ZIGBEE enable the formation of mesh networks or AHSN that may be capable of providing a messaging substrate that may span multiple kilometers. Consequently, if the health professional is within a certain proximity of his/her patients, it is then possible to retrieve physical activity data directly from their wearable/mobile devices without having to send IP traffic through the Internet.

Since BLUETOOTH devices typically cover a range between 10 to 20 meters, scatternets require multiple hops for a source node to communicate with a destination node that is a few hundred meters away. Moreover, not all applications require a sustained networking Foundation, particularly when they only communicate periodically in an asynchronous fashion. Delay tolerant networks (DTNs) may be ideal for mobile-to-mobile wearable communication. DTNs operate well in dynamic mobile environments where nodes only have intermittent connectivity. DTNs may be also suitable for applications that may tolerate asynchronous, high latency communication among mobile/wearable devices. There may be many wearable-based applications that may function in such a networking environment. For instance, a user with a smart insole wearable may broadcast his/her fastest mile to nearby friends or coach on the same running tracking application. DTN approaches coupled with existing wearables and mobile computing devices may enable a new class of ad-hoc applications that communicate entirely without any reliance On IP-based systems. One of the first protocols to achieve this, based on commercially available solutions is the Low Energy Socially Cognizant (LESC) protocol based on social patterns and Kalman-filter-based route selections that leverages BLUETOOTH Low Energy technology.

In mobile wearable applications, ad-hoc communication is required between mobile devices and wearable sensors. Due to limitations of power and size, devices may be equipped with radios that have short range capabilities. The coupling of mobility and short range communications may cause increased intermittency and preclude data propagation within DTNs. This becomes even more prevalent when Internet is not available or restricted as many wearable devices depend on centralized infrastructures to store and process data. The aforementioned centralized infrastructure is often referred to as the cloud.

Mobile wearables provide users the ability to monitor vital signs in new ways and enable freedoms that wired wearables cannot. Though these freedoms may be enhancements, they create new challenges for wireless communications and monitoring. LESC may provide efficient message and notification dissemination when Internet is not available and peers may be in close proximity.

When applied to emergency response situations, LESC has the ability to facilitate efficient message delivery. Alice who has an embedded pacemaker in her chest which is wirelessly connected to her phone, at a mall shopping. Alice's phone detects irregular heartbeats or even a heart attack. Simultaneously, two actions will occur, first, Alice's phone will attempt to contact 911 on Alice's behalf by sending other emergency information over the Internet. Second, the LESC routing algorithm will assess Alice's surroundings and route her emergency information privately, in an ad-hoc fashion to people nearby checking to see if any person is a certified health professional who may be able to help. In the first case, if Alice's phone was in an area with poor service LESC would still operate as mentioned, but a message would be piggy hacked so when Alice's information is routed to a device with Internet access that will forward her information to emergency responders. By leveraging DTNs as additional avenues for disseminating information, users do not have to rely solely on stable Internet connectivity to access crucial services in emergency situations.

Addressing security and privacy in wearables is a major undertaking due to the sensitivity of the personal data collected from the biosensors. It is therefore crucial to protect against information leakage to untrusted parties as private data travel through the DTN mesh. Ad-hoc mobile wearable communication networks have to be secured in two ways. First, in the formation of the scatternet or the DTN, it is important to establish trust between the nodes that may be creating direct connections to each other. BLUETOOTH LE has built-in link encryption enabled by AES-128 which is bootstrapped by the device pairing process (See FIG. 10) defined in the BLUETOOTH protocol. Secure pairing of devices (1005, 1010, and 1040) may be automated with NFC technology or users have to manually configure devices upon their first BLUETOOTH encounter. Through this process, users may ensure only trusted peers may be allowed to create direct connections with their wearable devices and guarantees that only trusted nodes may inject traffic into the ad-hoc network. Pairing may include pairing passwords between watch 1005 and mobile device 1010. There may be paring passwords between mobile device 1010 and mobile devices 1040.

The second level of security and privacy deals with end-to-end messaging. In many scenarios, a sender may want to guarantee that only the receiver is able to retrieve the contents of a message. To ensure this, traditional PKI-based asymmetric encryption techniques may be leveraged. Bootstrapping trusted end-to-end communication in ad-hoc networks is still an open research problem. Cryptographic key management is at the core of this issue because wearable devices need to be able to associate private keys to users and their devices. This may be done through a key distribution server or some out-of-band trusted medium to exchange keys. In a DTN, there is no guarantee that nodes will have reliable access to either a key server or, as is more common, a trusted out-of-band path.

Identity-based cryptography (IBC) is an alternative to traditional PKI cryptography where public keys may be generated from the recipient's unique identifier (e.g. email address). The sender may therefore encrypt messages for the recipient by only knowing the email address. The recipient in turn may obtain the appropriate private key through a key generation server 1107 whenever intermittent connectivity is available. The server 1107 providing Bob's certificate 1127 to Alice's smartphone 1110A and Alice's certificate 1117 to Bob's smartphone 1110B. Since messages may be encrypted with a public key bound to the recipient, it ensures that only the recipient may decrypt the message and view its content. However, it is important for wearable devices 1105A and 1105B to ensure they have a trusted communication path with the key generation server. By using short-lived public keys based on the recipient's email address, a user is able to send encrypted messages with guarantees that only the receiver may decrypt the message using his/her private key 1129B. By using a private key generation server 1107, the recipient may periodically obtain the private keys necessary to decrypt incoming messages bound to his/her email address. Hence, synchronization of revocation lists may be no longer required as in traditional PKI systems and nodes 1140 do not have to exchange public keys 1129A before they may securely communicate with one another.

Figure 12:
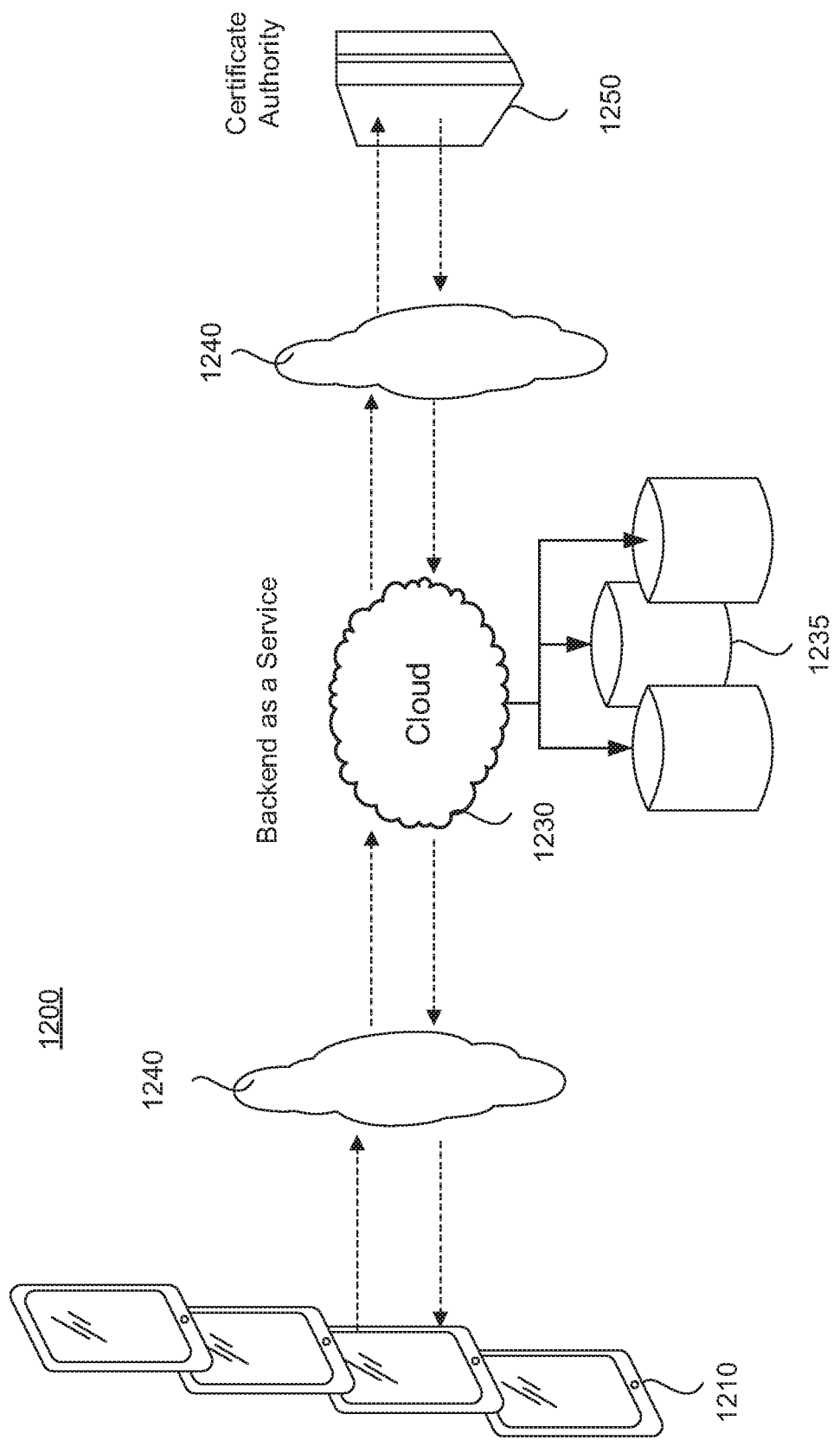
FIG. 12 illustrates a secure AHSN system.

FIG. 12 illustrates a secure AHSN system 1200. The AHSN system 1200 includes a plurality of participant devices 1210, a public utility communications system 1240, cloud 1230 and a certificate authority (CA) 1250, the details of which are described in more detail below. Participant devices 1210 may be a mobile communication device such as without limitation a cellular telephone, mobile telephone, smartphone, or satellite telephone. The participant device 1210 may sometimes be referred to as a node. Each node may have a plurality of node modes described in more detail later.

In one or more embodiments, the participant device 1210 accesses the cloud 1230, via the Internet, Intranet or other World Wide Web (WWW) network, to establish service and may download the AHSN application onto the participant's device 1210. Establishing service will be described in more detail in relation to FIG. 15 such that a peer certificate is created for each participant device 1210 from the certificate authority CA 1250. The communication between the device 1210 and cloud 1230 may be secure communications such as that communications will be encrypted especially after the certificate is established with the CA 1250. The communications from the cloud 1250 to the CA 1250 may be secure such that communications there between are encrypted across the public utility communications system 1240. The public utility communications system may include a cellular phone network, mobile communication network, or Internet. The cloud 1250 represents a cloud computing and cloud storage system 1235. The cloud 1250 may include a web-enable system which allows participant to interact with the service of the AHSN system.

To manage local storage on a node (i.e., participant device 1210), as well as, cloud storage 1235 when the Internet is available, the AHSN system 1200 may use cloud 1230 as a Backend-as-a-Service (BaaS) or mobile Backend-as-a-Service (MBaaS). Cloud 1230 may include a set of application programming interfaces (APIs), such as without limitation, for database management. Cloud 1230 may store and provide data analytics captured through the cloud 1230 to capture and measure application usage in real-time. Cloud code is an additional service to provide additional control over real-time data storage as well as interactions via application programming interfaces (APIs) such as by way of example, representational state transfer (RESTful) based APIs.

The Certificate Authority (CA) 1250 may be employed to establish trust between nodes (i.e., participants), CAs are popular for public key infrastructures (PKIs) because they serve as trusted nodes that digitally sign certificates for users. The role of the CA 1250 may be to generate a certificate, such as by way of example, a X.509 certificate fingerprint, for each participant from certificate signing requests. The CA 1250 may include one or more CAs. Communications with the CA 1250 may be authenticated and store basic certificate information about a participant.

In general from time to time, the participant devices 1210 may transfer messaging logs to the cloud 1230 for storage and future retrieval.

Figure 13A:
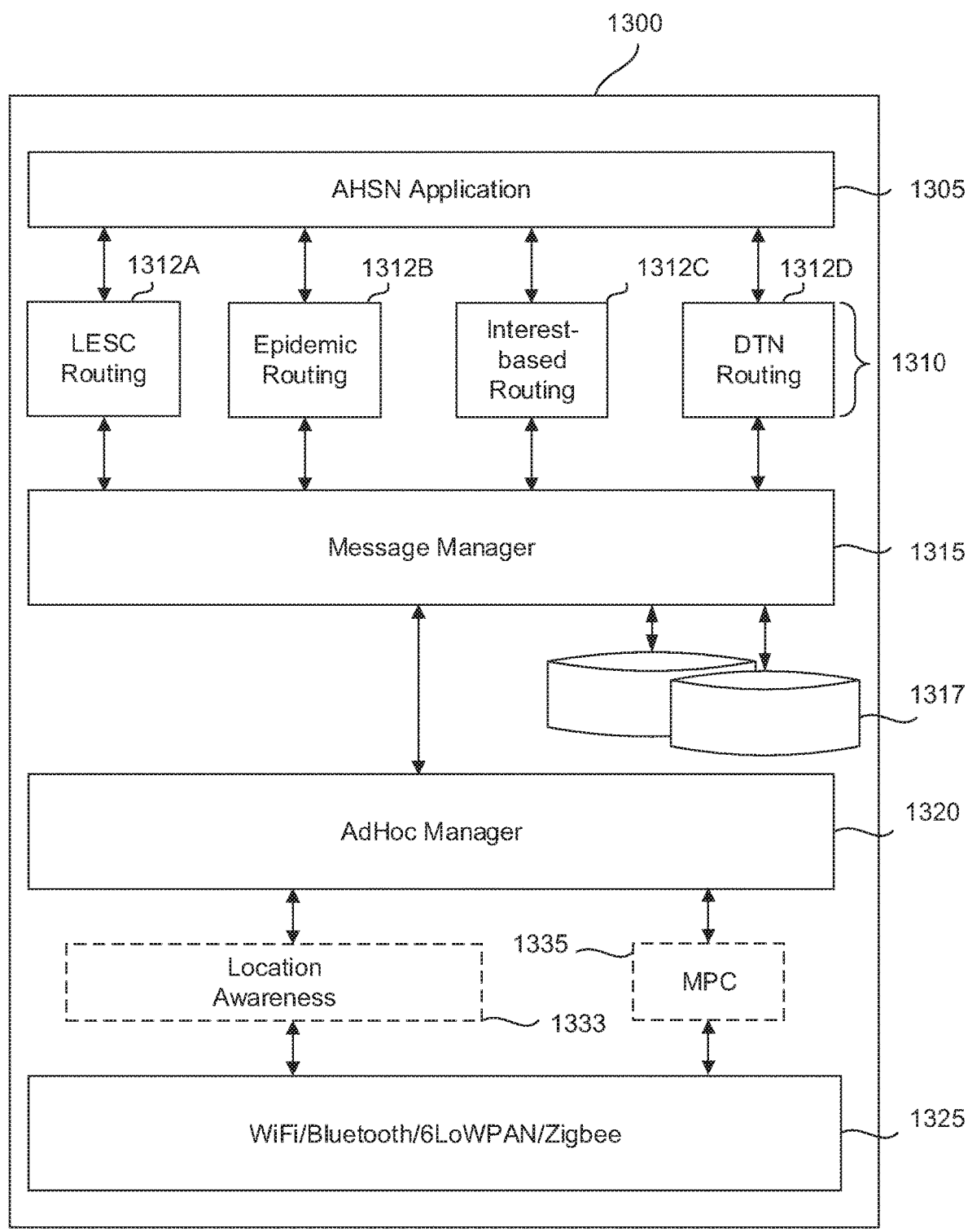
FIG. 13 illustrates an AHSN protocol stack.
Figure 13B:
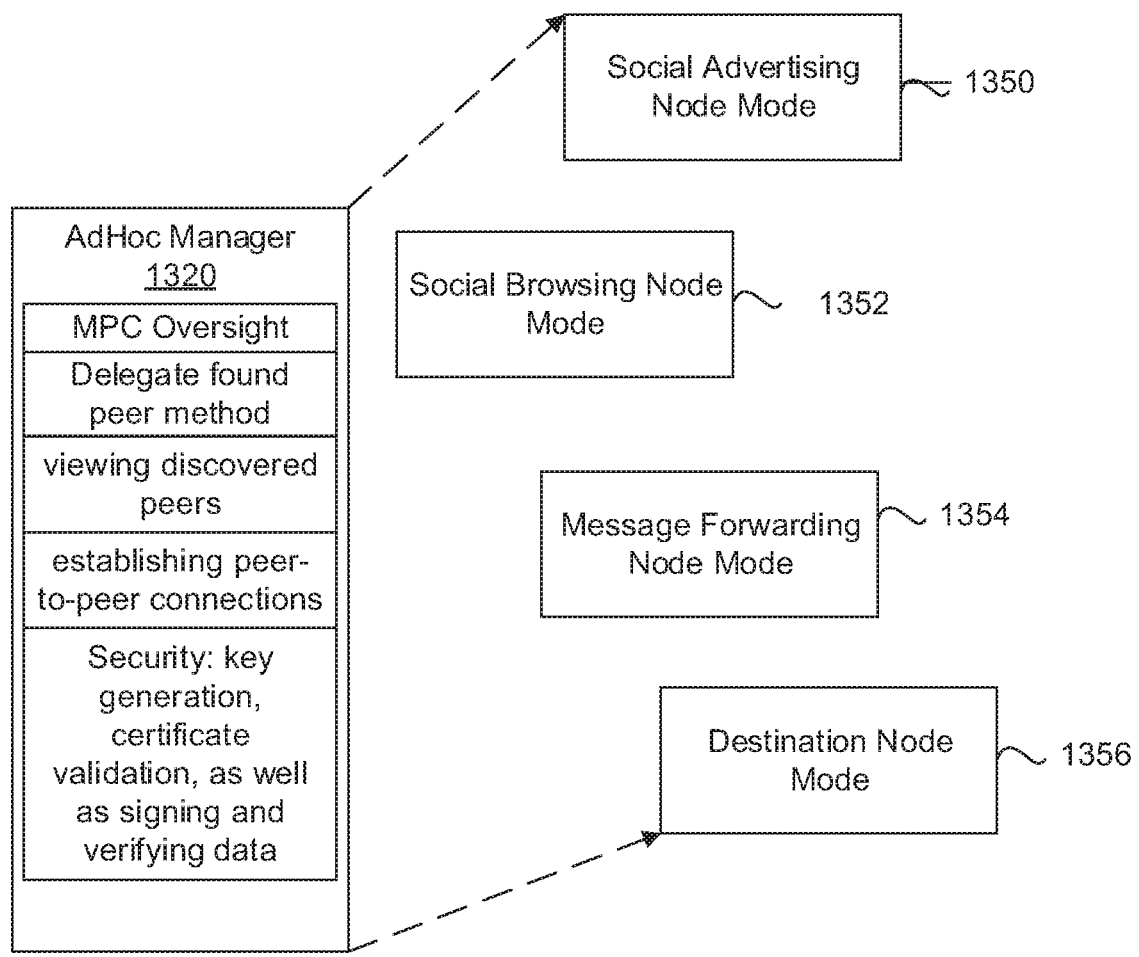

FIG. 13 illustrates an AHSN protocol stack 1300. The device 1210 may include a modular AHSN application layer 1305 for exchange of social media messages and communications that can evaluate multiple routing protocols. AHSN application layer 1305 may provide a front-end delay tolerant social networking application written in, by way of non-limiting example, Swift for an iOS type mobile device. The application serves as an evaluator of the LESC protocol as well as for other the AHSN routing protocols.

The stack 1300 may selectively use a respective one AHSN process of one or more prescribed AHSN routing processes and then enable users to interact, publish messages according to the AHSN routing process, and discover others that share social circles or common interests—all using a secured application that can operate offline. Filtered data is collected and performance results are provided based on message delivery statistics, locality and evolving social structures. In some embodiments, filtered data may remove all personal identifying information from data before processing. The stack 1300 also allows nodes to post messages to notable social media platforms such as FACEBOOK and TWITTER, when Internet is available. Social interactions, message delivery statistics, and locality may be captured by the stack 1300.

The processes described herein allow a basketball (i.e., message) in a play in which one player throws the basketball (i.e., message) near a basket (i.e., in proximity) to a teammate who jumps, catches the basketball in mid-air, and immediately puts the ball in the hoop. The stack 1300 combines elements of teamwork, pinpoint passing, timing and finishing. Thus, the stack 1300 allows socially associated users to knowingly, or unknowingly, behave as a team to deliver messages. The sender broadcasts encrypted messages, and when near other users, the other users via their mobile device catch the message and assist in delivery to the destination.

The stack 1300 may provide seamless network connectivity over BLUETOOTH, WI-FI, 6LoWPAN, ZIGBEE, NFC, etc., which allows at least two communication devices to communicate with each other within a short range. In one or more embodiments, the stack 1300 may leverage a multipeer connectivity protocol such as without limitation, the multipeer connectivity (MPC) framework in iOS. The stack 1300 may provide a publish-subscribe application layer 1305 similar to TWITTER (but not the same) that is familiar to end-users. The stack 1300 may provide one or more mobile DTN routing protocols in a routing layer 1310 to facilitate AHSN message delivery between intermittent nodes. The modular design of the stack 1300, along with its security and privacy features provide a platform for one or more social routing DTN protocols. The stack 1300 may be an AHSN mobile app that can be deployed on mobile devices such as iOS devices and ANDROID operating system (OS) devices.

The stack 1300 not only works in wireless ad hoc environments, but it provides DTN routing between nodes, delivering content when intermittency is prevalent.

The stack 1300 employs a location awareness protocol for mobile devices. By way of non-limiting example, BLUETOOTH Smart in iOS enables the use of iBeacon, which provides a location awareness function in mobile devices. In an embodiment, the stack 1300 may leverage iBeacon (i.e., location awareness module 1333) and as well as the multipeer connectivity (MPC) framework 1335 to provide for DTN routing through the routing layer 1310. Nonetheless, other operating systems, location awareness functions and multipeer connectivity protocols will be interfaced in a manner that allows for DTN routing as described herein.

Multipeer Connectivity

The MPC 1335 such as in accordance with iOS 7 may allow communications between iOS and OSX devices. MPC 1335 has the ability to work over infrastructure WI-FI networks as well as peer-to-peer WI-FI, and BLUETOOTH personal area networks. Services of nearby devices are advertised and may be discovered by the MPC 1335 by sending Bonjour text (TXT) records that can be interpreted by devices without establishing connections. Bonjour is by Apple®. Bonjour provides zero-configuration networking that includes one or more of service discovery, address assignment, and hostname resolution, for example. As can be appreciated, the example of iOS7 is for illustrative purposes only and other mobile operating systems may be used including without limitation, ANDROID operating systems.

Devices that are interested in services of neighboring peers can invite surrounding peers to pair and connect to ad hoc sessions to exchange relevant information ranging from text messages, files, to streaming video. MPC allows manual pairing between peers, but also allows for transparent pairing that can be done programmatically, allowing applications to dictate the requirements of the pairing process without user intervention.

Encrypted connections can be enabled in MPC 1335 to secure information from peer-to-peer. MPC 1335 will serve as the underlying middleware of the stack 1300 and allow for neighboring peers to discover each other and facilitate reliable encrypted peer-to-peer connections over WI-FI, BLUETOOTH, ZIGBEE, and 6LoWPAN, by way of non-limiting example, via the short range communication layer 1325. The block for short range communications layer 1325 may be part of or resident on the participant's mobile device 1210. BLUETOOTH protocol may include BLUETOOTH LE, BLUETOOTH Smart, etc.

Protocols' preferences can be selected with minimal intervention by the end-user and set to a default protocol during initial download. DTNs are intended to provide an overlay architecture above existing transport layers and ensure reliable routing during intermittency. Since the MPC protocol oversees the transport, network, data link, and physical layers the stack 1300 will be primarily concerned with happenings above the transport layer. The stack 1300 builds upon the MPC protocol to complete the session, presentation, and application layers by adding ad hoc manager 1320, message manager 1315, routing layer 1310, and the AHSN to the stack 1300.

The ad hoc manager 1320 is configured to directly oversee the protocol of MPC 1335 in the stack 1300 and may be responsible for the viewing discovered peers, and establishing peer-to-peer connections according the AHSN routing protocol. The ad hoc manager 1320 may be responsible for security such as by way of non-limiting example, key generation, certificate validation, as well as signing and verifying data. The MPC 1335 provides several initialization and delegate methods for advertising, browsing, and connection management that are accessed directly by the ad hoc manager 1320. The ad hoc manager 1320 may further perform these functions in one or more node modes, such as social advertising node mode 1350, social browsing node mode 1352, message forwarding node mode 1354 and destination node mode 1356.

In one or more embodiments, a session ensures all calls from the ad hoc manager 1320 to MPC 1335 have the following requirements: all connections are encrypted and all data sent from peer-to-peer is reliable. The MPC 1335 may support one or more modes. For example, the MPC 1335 may have two modes in which data can be sent: reliable and unreliable. The reliable mode may guarantee delivery of messages in the order in which they were sent, retransmitting messages if needed. The unreliable mode does not guarantee message delivery in any particular order and drops packets if they cannot be sent immediately. In one or more embodiments, to ensure message delivery through the stack 1300, the ad hoc manager 1320 may always send data in the reliable mode. The ad hoc manager 1320 also interfaces with a location awareness module 1333 to locate nodes in range of the mobile communications device.

The ad hoc manager 1320 may notify the respective protocol being used in the routing layer 1310 whenever a new peer has been discovered or lost. Additionally, the ad hoc manager 1320 may be responsible for taking action whenever a connection state changes. Key generation and retrieval may be handled by the ad hoc manager 1320 as well as generating certificate signing requests (CSRs), and storing and retrieving certificates.

The routing layer 1310 is responsible for leveraging peer-to-peer ad hoc connections to transform the mobile device for use into a delay tolerant mobile social network (i.e., AHSN system) that delivers messages to out of range nodes in the midst of intermittency. The routing layer 1310 is designed for modularity, permitting additional DTN routing schemes to be developed on top of the ad hoc manager 1320 to run seamlessly under the application layer 1305. The routing layer 1310 may include one or more DTN routing protocols such as without limitation, LESC 1312A, epidemic routing 1312B, interest-based routing 1312C or other delay tolerant network (DTN) routing 1312D protocol.

LESC 1312A is a socially cognizant delay-tolerant routing protocol designed to be implemented over commodity wireless technologies that facilitates message dissemination to out of range nodes. The operation of the LESC 1312A is performed in accordance with equations 1-6 above. Epidemic routing 1312B is a simple routing scheme that achieves effectiveness through gratuitous replication and delivery of messages upon node encounters. Lastly, an interest-based routing protocol 1312C operates in a similar manner to epidemic routing, except, instead of propagating messages to all peers, messages are only propagated to interested users. Of course, due to its modular nature, additional DTN routing protocols can be added to the routing layer 1310.

The message manager 1315 consists of universal methods provided to all protocols in the routing layer 1310 to translate communication between the ad hoc manager 1320 and the application layer 1305. When an AHSN peer is found, the ad hoc manager 1320 notifies the message manager 1315, which notifies the respective routing protocol 1310 which decides if it is interested in the particular peer that was discovered. The message manager 1315 also translates all messages from the application layer 1305 and routing layer 1310 to a common structure for the ad hoc manager 1320 to interpret.

The application layer 1305 may allow the user to interact directly with the mobile device, communicate directly with the cloud 1230 to store and retrieve information from the respective mobile device's storage 1317 through the message manager 1315, synchronize information with the cloud 1230 when connected to the Internet, as well as interact with the routing layer 1310. The application layer 1305 allows users to login to the application suite by creating new accounts manually. In one or more embodiments, the application layer 1305 may allow for seamlessly creating new accounts from existing TWITTER or FACEBOOK accounts. Once a user is logged in, the user interface provided by the application layer may greet them with a news feed, displaying content from friends they currently follow, as well as their own content.

The content through the AHSN application layer 1305 may display messages that were received by an implemented social routing protocol in the routing layer 1310. If a user has not been in communication range with any other AHSN nodes that was advertising information of interest, then no content may be shown. The AHSN application layer 1305 in the news feed, may display content from one, more or all of the friends a user is currently following. In some embodiment, content may be retrieved from the cloud 1230 whenever the respective device is connected to the Internet. The application layer 1305 may provide a convenient way for users to understand how their particular movements and social interactions contribute to DTN routing, but also allows users to engage with friends they may never come into contact.

FIG. 14A illustrates a mobile device 1400A with a log 1405A of AHSN users who follows the user of mobile device 1400A. In FIG. 14A, tab 1420 is highlighted to cause, the log 1405A to be displayed on the mobile device. On the left side of the display, the names of AHSN users are listed along with the last time, the user followed mobile device 1400A. In an embodiment, the most recent followers are listed in chronological descending order with the most recent listed first in the list. Selection of any AHSN user name or identify in the log 1405A may allow the user of mobile device 1400A to select the user and send a message. In some embodiments, a user in-range in the log may be highlighted or emphasized so that the user can recognize in-range followers and send a social message using an AHSN system described herein. The stack 1300 would allow the user to send a social message by a graphical user interface (GUI) for entry of a plain-text message using a keyboard or voice recognition.

FIG. 14B illustrates a mobile device 1400B with a log 1405B of messages of AHSN users passed (forwarded) by the mobile device 1400B to another AHSN user. In FIG. 14B, tab 1422 is highlighted to cause, the log 1405B to be displayed on the mobile device. The message number and destination node are indicated in the log 1405B on the right side of the display. The left side of the display indicates the name of the originator in one embodiment. In another embodiment, the right side of the display may indicate the name of the node from which the message was forwarded to mobile device 1400B. A highlighted tab represents a selected tab to switch between display logs. These messages exclude the respective user's own messages passed and only refer to the passing of other AHSN users' messages.

FIG. 14C illustrates a mobile device 1400C with a log 1405C of messages to AHSN users being passed (forwarded) by another user for the device 1400C. In FIG. 14C, tab 1424 is highlighted to cause, the log 1405C to be displayed on the mobile device 1400C. The message number and destination node are indicated in the log 1405C on the right side of the display. The left side of the display indicates the name of the user passing the message. The log 1405C refers to all of the respective user's messages that were passed by other users using one of the DTN routing protocols for the mobile device 1400C.

The stack 1300 may provide GUIs to allow users to quickly find other AHSN users in the surrounding area and to follow them if they are of interest. The stack 1300 includes a tabs or GUIs to allow users currently connected to the Internet to search all users using AHSN and to follow them if they are of interest.

Content in the logs may be populated when a passing user, and/or the user the message originated from have had an Internet connection at some point. Whenever a user passes a message, the passer is responsible for synchronizing the passing activity to the cloud 1230 or 1530 whenever Internet or public communication is available. The originator of the message can see messages delivered on their behalf, by synchronizing with the cloud 1230 when Internet is available and checking the tabs.

Therefore, the log 1400C provides visualization of the delivery of messages to out-of-range nodes using DTN routing protocols even if the originating node never comes into communication range of the recipient node.

The stack 1300 may provide GUIs to represent or display the respective user's profile; the amount of messages that have been created; the amount of AHSN users followed; and the amount of followers a respective user has.

The stack 1300 may provide GUIs for users to manually change typical social networking information such as their screen name, email address, and password. Optionally, users may change their preferred DTN routing protocol, by tapping the protocol of interest in a displayed list of routing protocols.

FIG. 15 illustrates a flow diagram of a sign up process 1500 to use a secure AHSN system 1200. Delay tolerant and ad hoc applications in nodes (i.e., mobile device 1210A and 1210B) may be vulnerable to attacks such as eavesdropping, denial of service, and compromised devices. A modified approach will be taken to ensure security in the delay tolerant social network (i.e., AHSN system 1200).

The intent of the stack 1300 is to provide an initial layer of security for DTN protocols of the routing layer 1310 and enable users to detect the identity of other AHSN system users, send encrypted information, verify the originating source of the information being passed, as well as ensure that data has not been modified—all with minimal dependence on centralized infrastructures. Additional security may be added to a secure AHSN system 1200 by incorporating mechanisms such as distributing CA functionality amongst nodes (i.e., mobile device 1210A, mobile device 1210B), or measuring trust in the routing layer 1310.

To enable the initial layer of security, secure AHSN system 1200 may employ public-key infrastructure (PKI) techniques to create a one-time PKI requirement that occurs during initial download and user-signup for the application. When a user initiates the sign-up process on their mobile device (i.e., device 1210A or 1210B), a RSA-2048 bit asymmetric private/public-key pair is generated by the respective device. Each user is then given a unique user-identifier which may be a 10-character string that represents the respective user for the duration of an active account.

The private/public-key pair is then used to generate a certificate signing request (CSR) 1540A by mobile device 1210A and CSR 1540B by mobile device 1210B that may contain the aforementioned user-identifier string in the "subject" field of the CSR 1540A or 1540B. The CSR 1540A or 1540B is then uploaded to the cloud 1530 through a secure socket layer (SSL) connection. After successful creation of the user, the cloud 1530, such as through RESTful API calls, connects to the CA 1550 and asks the CA 1550 to create a user account on its server if one is not in existence already. Creation of a user account on the CA 1550 is solely to keep track of certificates 1545A and 1545B created for a particular user. Individual users can have many devices, and therefore, private/public-key pairs, CSRs, and certificates are generated for each installation of the application on a particular device.

The cloud 1530 then forwards the CSR 1540A for mobile device 1210A and 1540B for device 1210B of the particular installation to the CA 1550 through by using an additional RESTful API call. The CA 1550 digitally signs the CSR 1540A and 1540B with a private key such as by non-limiting example, a RSA-4096 bit private-key, and produces a SHA-256 digest of its signature, resulting in a certificate (i.e., X-509 certificate) which encompasses the public-key generated by the originating device, as well as its user identifier as the subject of the certificate. The CA 1550 returns the certificate 1545A or 1545B to the cloud 1530, along with its own root certificate.

The cloud 1530 notifies the new device that its certificates are ready by pushing both, the newly generated certificates and the CA's root certificate represented by the two certificates at 1545A and 1545B to respective mobile devices 1210A and 1210B. By way of example, mobile device 1210A is associated with Alice and the CSR 1540A is created by Alice's device 1210A. The cloud 1530 passes CSR 1540A for Alice to CA 1550. By way of example, mobile device 1210B is associated with Bob and the CSR 1540B is created by Bob's device 1210B. The cloud 1530 passes CSR 1540B for Bob to CA 1550.

The certificates, denoted by 1545A, represent both the certificate for new device 1210A for Alice and the newly the CA's root certificate. The certificates, denoted by 1545B, represent both the certificate for new device 1210B for Bob and the newly the CA's root certificate.

When a mobile device has its own certificate as well as the CA's root certificate, it is now eligible to operate independently of the PKI, communicate securely with other AHSN-enabled devices, and detect modifications of other mobile devices certificates.

The process of generating keys and receiving certificates, such as a X.509 certificate, is depicted in FIG. 15. All messages disseminated using a DTN protocol from the routing layer 1310 are sent over encrypted connections. By way of non-limiting example, when using encryption required with authentication enabled, the datagram transport layer security (DTLS) with a mutual authentication cypher suite may be enabled.

Encrypting connections in MPC 1335 may require supplying an "identity" including of a private-key and a certificate made with the corresponding public-key during initializing. To create an identity, the mobile device 1210A or 1210B saves the private/public-key pair, along with the returned installation certificate from the CA 1550 to the respective devices iOS application keychain. Once these items are saved, an iOS keychain may automatically bind the certificate to the private-key to create an "identity". The binding takes place if the (X.509) certificate was created using the corresponding private/public-key pair.

After the "identity" is available, a delegate MPC function has to be implemented to verify and authenticate other users. To properly evaluate a user as a trusted AHSN user, the locally stored root certificate of the CA 1550 will be used. Every peer's (X.509) certificate has to pass evaluation against the root certificate before a connection can be established within the AHSN stack 1300. Peers who do not pass evaluation will be ignored and not allowed to connect to AHSN sessions.

The sign up process 1500 may include other activities such as to establish an account at both the cloud 1530 and the CA 1550. The cloud 1530 may be used to store AHSN messages in databases 1235.

Message Dissemination

After sign-up is complete and a mobile device receives its own certificate and CA root certificate, the user can disseminate messages to other AHSN users using one of the DTN routing protocols in the routing layer 1310. Whenever a user creates a message or perform an action such as follow/unfollow a user, stack 1300 performs two actions. The AHSN stack 1300 may save the action to the local database 1317 on the mobile device via the message manager 1317 and synchronizes the action with the cloud 1230 when Internet becomes available. Once an action is saved to the local database 1317 of the respective device it can be disseminated using a DTN routing protocol to interested AHSN users. The mobile device may include a computing device 505 described previously in FIG. 7.

The following description may provide further details into how messages are disseminated after being created by a user in the AHSN application layer 1305 and passed to the routing layer 1310.

FIG. 16 illustrates a flow diagram of decentralized communications process 1600 in the secure using the AHSN system. The process 1600 includes generating a message, denoted by the envelope symbol, corresponding to an advertisement as a publisher. Alice's communication device 1210A (hereinafter sometimes being referred to as "Alice") advertises an AHSN message for delivery using an AHSN routing method, such as a DTN routing protocol 1312D. The advertising message may include the message number Alice is advertising.

In the process 1600, one or more of the blocks and communications between nodes may take place in the order shown or in a different order. One or more of the blocks may be performed contemporaneously. Additionally, one or more of the blocks and lines may be deleted or additional blocks and lines added. For example, depending on the security process, verification, and certificate transfer, a different protocol may be used. However, security to ensure secure communications when passing some messages is employed.

The "publisher advertisement" is sent on line 1602 and received by Bob's mobile communication device 1210B (hereinafter sometimes referred to as "Bob"), wherein Bob is in the communication range of Alice using a short range communication protocol (i.e., WI-FI, BLUETOOTH, 6LoWPA, ZIGBEE, etc.). The same "publisher advertisement" on line 1602 may be received by others. The description herein, can be repeated for others in the reception range of the short range communication protocol. However, the process to and from the AHSN publisher and an in-range AHSN user is described.

Returning again to the exchange between Alice and Bob, at block 1604, user Bob will determine if he is interested in information from user Alice. Bob may cause Bob's device 1210B to then generate a response to Alice, the response is then communicated on line 1606 from Bob to Alice using a short range communication protocol. By way of non-limiting example, the response, denoted by the envelope, may include an invitation and a message number. The response is received by Alice. At block 1607, Alice's device 1210A will determine whether Bob has rights to request the message. Alice will generate an acceptance response, denoted by the envelope, on line 1608. For example, an acceptance response may be an acceptance invitation. The acceptance response is received by Bob.

Bob may then generate and send (transmit) a communication package with Bob's certificate on line 1610 where the certificate was provided by CA 1250 upon signup by Bob. At block 1612, Alice will process the certificate through the stack 1300 to verify the trust of the certificate. At block 1614, once, the certificate is verified, Bob's public key is extracted by Alice. On line 1616, Alice then generates and sends (transmits) a communication package with Alice's certificate to Bob. At block 1618, Bob will process the certificate through the stack 1300 to verify the trust of the certificate. At block 1620, Bob will extract Alice's public key. Lines 1622 and 1624 represent secure connections between Alice and Bob for encrypted communications. At block 1626, Alice will gather and sign the requested message with Alice's private key and, at block 1628, the messages, denoted by the envelop with a lock, will be encrypted with Bob's public key to generate a secure message. Alice communicates the secure message on line 1630.

Bob receives the message on line 1630 and, at block 1632, decrypts the secure message. At block 1634, Alice's signature is processed by the mobile device and verified with Alice's public key. Once verified, Bob stores the secure message in local database 1317.

One or more blocks 1626, 1628, 1630, 1632 and 1634 may be repeated until all of the requested messages are communicated by Bob.

By way of non-limiting example, while Bob and Alice are connected, denoted by the lines 1622 and 1624, Alice signs (block 1626) a hash to all of the messages Bob requested with her private-key and encrypts (blocks 1628) the plain-text messages with Bob's public-key. All of the plain-text messages along with the respective signatures are queued and sent to Bob beginning with the first message Bob requested in his invitation. The hash may be a secure hash algorithm 1 (SHA1) hash.

Once received, Bob decrypts the messages with his private-key and verifies all the messages indeed belong to Alice by doing a SHA1 hash of the message and verifying them against Alice's public-key and received signatures.

Social Advertising (Plain-Text) Node Mode

An AHSN-enabled device (i.e., Alice device 1210A) roam freely advertising basic social media information in plain-text nomenclature to assist other AHSN-enabled devices with making the decision on whether to request a connection or not. The AHSN media service, via the stack 1300, takes place between peers (device-to-device) using the corresponding peer public-keys and does not require Internet infrastructure or cellular/mobile communications network once service sign-up is complete. The social advertising node mode 1350 includes communications described above in relation to FIG. 16 beginning at lines 1602 using, for example, a DTN routing protocol.

In an embodiment, the message being advertised may be a social media message.

Social Browsing Node Mode

A social browsing node (i.e., Bob device 1210B) is now able to quickly decide whether it is interested in the message number for the respective user-identifier string and whether it should request a connection from the advertising node (i.e., Alice device 1210A). Each communication device is configured to operate in and switch between a social browsing node mode 1352 and a social advertising node mode 1350. The social browsing node mode 1352 may begin at line block 1604 where the device when browsing browses for advertisements of those publisher nodes in-range. The device 1210B may browse for multiple advertiser/publisher nodes. The term advertiser node and publisher node may be used interchangeable herein. As can be appreciated from the description herein, Alice and Bob are interchangeable in the process 1600 as the switch between a social advertising node and a social browsing node. Thus, in some embodiments, device 1210B represents a social browsing node in the AHSN system and device 1210A represents a social advertising node in the AHSN systems and are not limited to Bob and Alice.

In a non-limiting example, the message of interest by Bob is a social media message and Bob is in-range of the advertiser/publisher node.

FIG. 16 depicts a scenario in which Alice is operating in the social advertising node mode 1350 and Bob is operating in the social browsing node mode 1352. Once Bob sees Alice's advertisement information in plain-text, displayed on the display of the communication device 1210B, and decides he is interested, Bob causes the communication device 1210B to send (transmit) Alice an invitation along with the first message number of Alice's message he is interested in receiving. Alice's device understands that Bob is interested in those message numbers between the message number Bob sent on line 1606 and the message number Alice was advertising on line 1602.

Alice then accepts the invitation and sends (transmits) to Bob in a communication package her certificate. Simultaneously, Bob sends (transmits) to Alice his certificate in a communication package and they receive and evaluate each other's certificate. Once both users pass verification, Alice's device extracts Bob's public-key and user-identifier string from Bob's certificate. Bob's device proceeds to extract Alice's public-key and user-identifier from Alice's certificate, and an encrypted connection is made between the two peers using the corresponding peers public-key.

As an example, Bob may be a follower of Alice. In some instance, the message number may simply be the next available social media message from Alice. However, in some instances, Bob may not have crossed paths with Alice for a while. The current message advertised by Alice may be message 20, however, Bob has not received messages 10-20. Thus, Bob may request message 10 such that Alice then sends one or more communication packages with messages 10-20 to the extent Bob remains in-range with Alice for communications to take place. The number of social messages being transferred may include one or more messages.

In some instance, Bob may have not received messages 10-20 but will request by message number, message 15. Thus, Alice would send messages 15-20.

The nodes freely roam and switch back and forth between a social advertising node mode and a social browsing node mode. As Alice may be interested in Bob's messages. In some instances, the advertising node may be referred to as a first communication node. In some instance, a browsing node may be referred to as a second communication node.

Message Forwarding Node Mode

FIG. 17 illustrates a flow diagram of message forward selection communications process 1700 in the secure AHSN system. Depending on the DTN routing protocol being used in the routing layer 1310 of respective mobile communication device, prospective communication nodes can become message forwarders for other users. In the process 1700, one or more of the blocks and communications between nodes may take place in the order shown or in a different order. One or more of the blocks may be performed contemporaneously. Additionally, one or more of the blocks and lines may be deleted or additional blocks and lines added. For example, depending on the security process, verification, and certificate transfer, a different protocol may be used. However, security to ensure secure communications when passing some messages is employed.

For example, in epidemic and interest-based routing, a node becomes a message forwarder for a particular user-identifier whenever a new message is requested and received. When a communication node becomes a message forwarder, it follows a similar process to the one outlined in FIG. 16, with some minor differences that are shown in FIG. 17.

In process 1700, at block 1702, Bob may send (transmit) a communication package with an invitation and message # interested with a request, denoted by the envelope, to be a message forwarder on line 1704. Alice receives the invitation, message # and message forwarder request. The exchanged process 1600 (i.e., lines 1610 and 1616) at lines 1704 may be repeated until the secure connection, at lines 1706 and 1708 are created for encrypted communication between communication nodes of Alice and Bob. At block 1710, Alice will gather and sign requested messages with her respective peer private key. At block 1712, Alice will select Bob as a message forwarder based on the routing layer 1310, such as LESC routing 1312A. At block 1712, Alice will encrypt the message with Bob's public key.

For each message Bob receives from Alice, on line 1715, Bob decrypts the message with Bob's private key, at block 1716. At block 1718, Bob verifies Alice's signature with Alice's public key and stores the messages and signatures. At block 1720, Bob stores Alice's certificate. Generally, Bob stores the decrypted plain-text message along with the signature of the message.

After Bob successfully receives all of Alice's messages, Alice's certificate is stored, such as without limitation, in an iOS keychain for future retrieval. Bob then requests a disconnection at line 1724 and both devices disconnect, at lines 1724 and 1726. Both Bob and Alice may return to advertising in plain-text or browsing. However, in the process as shown, Bob advertises messages for both Bob's social messages and Alice's message to be forwarded on line 1728. Assume, Alice's message and message number is YyCVxDcerf: 8.

At block 1730, Alice is now in a browsing node mode. Therefore, Alice may need to decide if interested in Bob's and/or Alice's message. Since Bob and Alice may be followers, Alice may be interested in Bob's social media messages currently available. If Alice is interested, in Bob's social media messages such as for followers, the process 1700 will transition back to the process 1600 wherein the Alice and Bob nodes are reversed.

Becoming a message forwarder may add additional key/value pairs to a nodes advertising dictionary. Assume Bob's message is cN2LoWpOVw: 16. If Bob's original advertising dictionary for broadcasting that he is a passer of his own message(s) and message number (i.e., cN2LoWpOVw: 16), before he became an advertiser for Alice. Then his new advertising dictionary becomes his own message and message number and Alice's message and message number (i.e., cN2LoWpOVw: 16, YyCVxDcerf: 8) after he is designated a message forwarder for Alice's messages. The message manager 1315 may provide the message and number for assembling a publisher message that includes both Bob's message and Alice's message and corresponding numbers. The example provides an example of two messages being advertised by Bob. The first message being his own original social media message. The second message being a message to an out-of-range destination device. However, Bob can advertise a plurality of message for forwarding by other nodes where Bob has agreed to be a message forwarder. In other words, the advertisement package on line 1728 is not limited to two messages.

In operation, the device 1210B in process 1700 is a message forwarding node operating in according with the message forwarding node mode in a receiving phase described in relation to process 1700. The device 1210A in process 1700 is a message forwarding node operating in accordance with the message forwarding node mode in a transmitter phase in relation to the process 1700. Device 1210A is a message forwarding originator. The devices 1210A and 1210B may be interchanged in process 1700 as the devices switch between being a message forwarding node in a receiving phase or a message forwarding node in a transmitter phase.

Message Dissemination

FIG. 18 illustrates a flow diagram of message forwarder dissemination communications process 1800 in the secure AHSN system. FIG. 18 depicts interaction between Bob and Carol for message dissemination where Carol is interested in Alice's message that Bob is a message forwarding node. Thus, Bob may sometimes be referred to as a message forwarding node in a transmitter phase to either the destination or another forwarding node. Carol is a mobile communication device 1210C and may sometimes be referred to as a destination node, in this example. In operation, Alice, Bob and Carol may serve as one or more of the advertising node, browsing node, forwarding node and destination node during interactions through the AHSN system which relies on peer-to-peer communications using a short range communications protocol. In this example, the Bob and Carol are in-range of each other using short range communications. Alice is not in range with at least Carol. However, the time when Bob and Carol are in-range, Bob may not be in-range with Alice.

In the process 1800, one or more of the blocks and communications between nodes may take place in the order shown or in a different order. One or more of the blocks may be performed contemporaneously. Additionally, one or more of the blocks and lines may be deleted or additional blocks and lines added. For example, depending on the security process, verification, and certificate transfer, a different protocol may be used. However, security to ensure secure communications when passing some messages is employed.

A similar process to the message forwarding previously described in relation to FIG. 17 takes place. At line 1802, Bob advertises as a publisher for Bob's messages originating from Bob and Alice messages being forwarded via Bob. The message advertisement may include the message numbers for both Bob and Alice's message. Thus, in the advertising mode, there may be originating message publishing such as described by the process 1600 of FIG. 16 and forwarding message advertising for message dissemination using the AHSN media service such as described by the process of FIG. 18.

In the scenario of FIG. 18, Carol receives the advertisements on line 1802. Carol determines if interested in Alice messages being forwarded via Bob at block 1804. Hence, if interested, Carol then sends a communication package with an invitation and message # interested in for the Alice messages on line 1806. Bob generates a message to accept the invitation and sends (transmits) such invitation on line 1808. On line 1808, Carol generates and sends (transmits) a communication with Carol's peer certificate 1810 to Bob. At block 1812, Bob will process the certificate using the computing device to verify the trust of Carol's certificate and at block 1814, extract Carol's public key.

On line 1816, Bob generates a communication with Bob's certificate and sends (transmits) the communication on 1816. Carol will receive Bob's certificate and may process the certificate to verify the trust of Bob's certificate, at block 1818. At block 1820, Carol will extract Bob's public key. This may serve to assist in establishing a secure communication on lines 1822 and 1823 between Carol and Bob. Additionally, Bob retrieves Alice's certificate, at block 1824, previously stored in local database 1317. At block 1826, Bob encrypts Alice's certificate with Carol's public key. Then, on line 1830, Bob generates a communication packet to send (transmit) the encrypted Alice certificate to Carol.

At block 1832, Carol may receive and decrypt communications with Carol's private key and, at block 1834, process Alice's certificate to verify the trust of Alice's certificate. At block 1836, Carol extracts Alice's public key.

In general, Bob sends (transmits) his certificate to Carol to establish an encrypted connection, as well as forwards Alice's certificate. Carol verifies both Bob's and Alice's certificates against the AHSN CA root certificate she has stored locally.

At block 1838, Bob gathers Alice's message and signatures for transmission to Carol. At block 1840, Bob encrypts one or more of Alice's messages with Carol's public key. On line 1842, Bob sends (transmits) Alice's plain-text messages, encrypted with his private-key, to Carol along with the original signatures Alice gave to him during their previous encounter (describe in relation to FIG. 17).

At block 1844, Carol then receives the communication from Bob on line 1842 and decrypts the messages using Bob's public-key, revealing Alice's plain-text messages. Carol takes hashes, such as, without limitation, generated by a secure hash algorithm 1 (SHA-1), of Alice's plain-text messages and, at block 1846, uses the public-key from Alice's certificate along with the signatures Carol received from Bob to process, via the computing device of device 1210C, the certificate and signatures to verify each one of Alice's messages received from Bob was not modified and came from Alice.

In one or more embodiments, the system described herein may comprises: a publisher communication device configured to publish an emergency message for delivery using a short-range wireless communication protocol within an area; and a dedicated-subscriber device within a range of the publishing device to receive, via the short-range wireless communication protocol, the emergency message. The area may be a school campus; the publisher communication device is associated with a teacher or school personnel; and the dedicated-subscriber communication device is associated with a first responder within the area. The area may be a banking campus; the publisher communication device is associated with a teller or bank personnel; and the dedicated-subscriber device is associated with a first responder within the area.

The short-range wireless communication protocol may be compatible with a BLUETOOTH Low Energy protocol. The short-range wireless communication protocol may be compatible with WI-FI. In the system, the publisher communication device is further configured to select in-range mobile devices as nodes to carry the published emergency message from within the area to outside of the area.

The method may comprise: publishing by a publisher communication device an emergency message for delivery using a short-range wireless communication protocol within an area; and receiving by a dedicated-subscriber device, within a range of the short-range wireless communication protocol, the emergency message. The area may be a school campus; the publisher communication device is associated with a teacher or school personnel; and the dedicated-subscriber communication device is associated with a first responder within the area. The area may be a banking campus; the publisher communication device is associated with a teller or bank personnel; and the dedicated-subscriber communication device is associated with a first responder within the area. The short-range wireless communication protocol may be compatible with a BLUETOOTH Low Energy protocol. The short-range wireless communication protocol may be is compatible with WI-FI. The method further comprises, selecting, by the publisher communication device, in-range mobile devices as nodes to carry the published emergency message from within the area to outside of the area.

In one or more embodiments, the device comprising: a publisher communication device configured to publish an emergency message for delivery using a short-range wireless communication protocol within an area. The publisher communication device including: a first communication interface operable to receive sensed data or emergency data; a second communication interface for communicating to a subscriber communication device within a range of the publishing device, using the short-range wireless communication protocol, for ad-hoc dissemination of the emergency message; and a third communication interface operable to communicate with a communication network to alert a first responder of the sensed emergency data, simultaneously with the dissemination of the emergency message using the short-range wireless communication protocol. The communication network may be an Internet, Intranet, telephone network, cable network or cellular telephone network. The sensed data or emergency date may comprise medical parameters. The short-range wireless communication protocol may be compatible with a BLUETOOTH Low Energy protocol. The short-range wireless communication protocol may be compatible with WI-FI. The publisher communication device is further configured to select in-range mobile devices as nodes to carry the published emergency message from within the area to outside of the area.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" may be intended to include the plural forms as well, unless the context clearly indicates otherwise. Furthermore, to the extent that the terms "including," "includes," "having," "has," "with," or variants thereof may be used in either the detailed description and/or the claims, such terms may be intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein may be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
    a plurality of communication devices in a social network, the plurality of communication devices comprising:
        a publisher communication device configured to publish (i) a social message of the publisher communication device for delivery to one or more follower communication devices within an area accessible using a short-range wireless communication protocol without the need of Internet or infrastructure-based Radio Access Network (RAN) and (ii) a forwarding message for a destination follower communication device outside of the area using a delay tolerant network (DTN) routing communication protocol;
        a forwarding communication device within the area that is selected to receive the forwarding message to subsequently forward the forwarding message within the social network using the DTN routing communication protocol from the publisher communication device, the forwarding communication device being selected based on diversity of nomadicity associated with mobility of the forwarding communication device with respect to the social network such that the diversity of nomadicity is a prediction calculated based on whether the forwarding communication device will come in contact with communication devices outside the area of the publisher communication device for further dissemination of the forwarding message to the destination follower communication device; and
        at least one follower communication device in the area of the publisher communication device that receives the social message from the publisher communication device;
        wherein selection of the forwarding communication device is based on a utility value for diversity of nomadicity $Udn_i(t)$ from a previous time $t\tau$ to time t according to the following formula:

$$Udn_i(t) = |n_i(t-\tau) \cup n_i(t)| - |n_i(t-\tau) \cap n_i(t)|$$

wherein n is the subset of nodes in range of i the forwarding communication device under consideration for selection.

2. The system of claim 1, wherein the area is a school campus; the publisher communication device is associated with a teacher or school personnel; and the at least one follower communication device is a dedicated-subscriber communication device associated with a first responder within the area.

3. The system of claim 1, wherein the area is a banking campus; the publisher communication device is associated with a teller or bank personnel; and the at least one follower communication device is a dedicated-subscriber device associated with a first responder within the area.

4. The system of claim 1, wherein the social message comprises a plurality of messages;
    the publisher communication device being configured to select one of a reliable mode of delivery and an unreliable mode of delivery to deliver the plurality of messages;
    the reliable mode of delivery guarantees delivery of the plurality of messages in an order in which the messages are sent; and
    the unreliable mode of delivery does not guarantee delivery of the plurality of messages in any particular order and drops message packets.

5. The system of claim 1, further comprising a cloud server to receive a first transaction log from the publisher communication device; a second transaction log from the destination follower communication device; and a third transaction log from the at least one follower communication device.

6. The system of claim 1, wherein the publisher communication device comprises a display device; and
    further comprising a graphical user interface (GUI) loaded on the publisher communication device to:
        selectively display on the display device a log representative of delivery of the forwarding message to an out-of-range communication device associated with the social network using the DTN routing communication protocol;

selectively publish the social message via the GUI displayed on the display device; and selective browse, via the GUI displayed on the display device, for other social messages published by any of the plurality of communication devices in the social network.

7. The system of claim 1, wherein the communications between the publisher communication device, the destination follower communication device, and the at least one follower communication device communicate the social message and the forwarding message using an encrypted communication protocol.

8. A device comprising:
a publisher communication device having at least one processor configured to:
selectively publish a social message for delivery using a short-range wireless communication protocol to followers, each follower associated with a follower communication device in a social network within an area and a forwarding message received from another device in the social network for a destination follower communication device using a first delay tolerant network (DTN) routing communication protocol without need of Internet or an infrastructure-based Radio Access Network (RAN);
selectively browse within the area for and receive a social message from another publisher communication device in the social network using the short-range wireless communication protocol without the need of the Internet, or the infrastructure-based Radio Access Network (RAN), and
forward within the area, via the short-range wireless communication protocol, the forwarding message using a second DTN routing communication protocol to one of the destination follower communication devices, when the forwarding message is for the destination follower communication device and a respective one communication device of the followers selected as a forwarding communication device to subsequently forward the forwarding message within the social network without the need of the Internet or the infrastructure-based Radio Access Network (RAN), wherein the forwarding communication device being selected based on diversity of nomadicity associated with mobility of the forwarding communication device with respect to the social network such that the diversity of nomadicity is a prediction calculated based on whether the forwarding communication device will come in contact with one or more socially related communication devices associated with the social network for further dissemination of the forwarding message to the destination follower communication device; wherein selection of the forwarding communication device is based on a utility value for diversity of nomadicity $Udn_i(t)$ from a previous time t–τ to time t according to the following formula:

$$Udn_1(t)=|n_i(t-\tau)\cup n_i(t)|-|n_i(t-\tau)\cap n_i(t)|$$

wherein n is the subset of nodes in range of i the forwarding communication device under consideration for selection.

9. The device of claim 8, wherein the area is a school campus; the publisher communication device is associated with a teacher or school personnel to publish an emergency message for receipt by at least one follower communication device associated with a first responder within the area.

10. The device of claim 8, wherein the area is a banking campus; the publisher communication device is associated with a teller or bank personnel to publish an emergency message for receipt by at least one follower communication device associated with a first responder within the area.

11. The device of claim 8, wherein the social message comprises a plurality of social messages;
the publisher communication device being configured to select one of a reliable mode of delivery and an unreliable mode of delivery to deliver the plurality of social messages;
the reliable mode of delivery guarantees delivery of the plurality of social messages in an order in which the plurality of social messages is sent; and
the unreliable mode of delivery does not guarantee delivery of the plurality of social messages in any particular order and drops message packets.

12. The device of claim 8, wherein the publisher communication device comprises a display device; and
further comprising a graphical user interface (GUI) loaded on the publisher communication device to:
selectively display on the display device a log representative of delivery of the forwarding message to an out-of-range communication device associated with the social network using the DTN routing communication protocol;
selectively publish, via the GUI displayed on the display device, the social message; and
selectively browse, via the GUI displayed on the display device, for and to receive the social message from the another publisher communication device.

13. The device of claim 8, wherein the social message and the forwarding message are encrypted by the publisher communication device using an encrypted communication protocol.

14. The device of claim 8, wherein the publisher communication device being configured to communicate a transaction log of message communications to a cloud server.

15. A method comprising:
selectively publishing, by a publisher communication device with a processor, a social message for delivery using a short-range wireless communication protocol to followers, each follower associated with a follower communication device in a social network within an area and a forwarding message received from another device for a destination follower communication device using a first delay tolerant network (DTN) routing communication protocol without need of Internet or an infrastructure-based Radio Access Network (RAN;
selectively browsing, by the publisher communication device, within the area for and receiving a social message from another publisher communication device in the social network using the short-range wireless communication protocol without the need of the Internet or the infrastructure-based Radio Access Network (RAN, and
forwarding within the area, via the short-range wireless communication protocol, the forwarding message using a second DTN routing communication protocol to one of the destination follower communication device when the forwarding message is for the destination follower communication device and a respective one communication device of the followers selected as a forwarding communication device to subsequently forward the forwarding message within the social network without the need of the Internet or the infrastructure-based Radio Access Network (RAN), wherein the forwarding communication device being selected based on diversity of nomadicity associated with mobility of the forwarding communication device with respect to the social network such that the diversity of nomadicity is a prediction calculated based on whether the forwarding communication device will come in contact with one or more socially related out-of-range communication devices associated with the social network for message dissemination to destination follower communication device;

wherein selection of the forwarding communication device is based on a utility value for diversity of nomadicity $Udn_i(t)$ from a previous time $t-\tau$ to time $t$ according to the following formula:

$$Udn_i(t) = |n_i(t-\tau) \cup n_i(t)| - |n_i(t-\tau) \cap n_i(t)|$$

wherein n is the subset of nodes in range of i the forwarding communication device under consideration for selection.

16. The method of claim 15, wherein the area is a school campus; the publisher communication device is associated with a teacher or school personnel to publish an emergency message for receipt by at least one follower communication device associated with a first responder within the area.

17. The method of claim 15, wherein the area is a banking campus; the publisher communication device is associated with a teller or bank personnel to publish an emergency message for receipt by at least one follower communication device associated with a first responder within the area.

18. The method of claim 15, wherein the social message comprises a plurality of social messages; and further comprising
selecting by the publisher communication device one of a reliable mode of delivery and an unreliable mode of delivery to deliver the plurality of social messages;
the reliable mode of delivery guarantees delivery of the plurality of social messages in an order in which the plurality of social messages is sent; and
the unreliable mode of delivery does not guarantee delivery of the plurality of social messages in any particular order and drops message packets.

19. The method of claim 15, further comprising: encrypting the social message using an encrypted communication protocol; and encrypting the forwarding message using the encrypted communication protocol.

* * * * *